US010254777B2

(12) United States Patent
Duong

(10) Patent No.: US 10,254,777 B2
(45) Date of Patent: Apr. 9, 2019

(54) REGULATOR CIRCUIT WITH ENHANCED RIPPLE REDUCTION SPEED

(71) Applicant: SAMSUNG ELECTRONICS CO., LTD., Suwon-si, Gyeonggi-do (KR)

(72) Inventor: Quoc Hoang Duong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 362 days.

(21) Appl. No.: 14/840,257

(22) Filed: Aug. 31, 2015

(65) Prior Publication Data

US 2017/0063217 A1 Mar. 2, 2017
US 2017/0308107 A9 Oct. 26, 2017

(30) Foreign Application Priority Data

Jul. 14, 2015 (KR) .................. 10-2015-0099554

(51) Int. Cl.
*G05F 1/575* (2006.01)
*H02M 1/14* (2006.01)
*H02M 1/00* (2006.01)

(52) U.S. Cl.
CPC .............. *G05F 1/575* (2013.01); *H02M 1/14* (2013.01); *H02M 2001/0003* (2013.01); *H02M 2001/0025* (2013.01)

(58) Field of Classification Search
CPC ......... G05F 1/56; G05F 1/575; H03K 17/687; H03K 3/012; H03K 19/0013; H03K 19/01714; H02M 1/14; H02M 3/33546; H02M 2001/007; H02M 3/33584; H02M 3/33592; H02M 2001/0058; H02M 2001/0003; H02M 2001/0025; Y02B 70/1433; H02P 25/098; H03H 9/6496
See application file for complete search history.

(56) References Cited

U.S. PATENT DOCUMENTS

| 6,541,946 | B1 * | 4/2003 | Chen | G05F 1/575 323/274 |
| 6,703,815 | B2 * | 3/2004 | Biagi | G05F 1/575 323/275 |
| 7,268,524 | B2 * | 9/2007 | Kase | G05F 1/575 323/282 |
| 7,502,719 | B2 | 3/2009 | Moraveji | |

(Continued)

*Primary Examiner* — Gary L Laxton
*Assistant Examiner* — Demetries A Gibson
(74) *Attorney, Agent, or Firm* — Volentine, Whitt & Francos, PLLC

(57) ABSTRACT

A regulator circuit includes an OP-amp, buffer, power transistor, voltage divider, load, and feedback current generator. The OP-amp generates a first voltage signal by amplifying a difference between input and feedback voltage signals, and drives a first node as the first voltage signal. The buffer drives a second node as a second voltage signal based on the first voltage signal. The power transistor includes drain, gate and source terminals respectively connected to a supply voltage, the second node, and a third node. The voltage divider generates the feedback voltage signal by dividing an output voltage signal of the third node. The load includes a terminal connected to the third node and another terminal receiving a ground voltage. The feedback current generator provides a first feedback current corresponding to a ripple of the output voltage signal to the first node for enhancing a speed at which the ripple reduced.

18 Claims, 22 Drawing Sheets

(56) References Cited

U.S. PATENT DOCUMENTS

| | | |
|---|---|---|
| 8,148,960 B2 | 4/2012 | Tonomura |
| 8,283,906 B2 | 10/2012 | Shito |
| 8,294,441 B2 | 10/2012 | Gurcan et al. |
| 8,502,513 B2 | 8/2013 | Imura |
| 8,710,914 B1 | 4/2014 | Guhados et al. |
| 8,716,993 B2 | 5/2014 | Kadanka |
| 8,841,893 B2 * | 9/2014 | Bulzacchelli ............ G05F 1/575 323/280 |
| 2003/0214275 A1 * | 11/2003 | Biagi ....................... G05F 1/575 323/280 |
| 2008/0180071 A1 * | 7/2008 | Moraveji ................. G05F 1/575 323/268 |
| 2008/0258701 A1 * | 10/2008 | Liu ..................... H02M 3/1588 323/328 |
| 2010/0181972 A1 | 7/2010 | Kawagoshi |
| 2011/0068758 A1 * | 3/2011 | Chiu ........................ G05F 1/575 323/280 |
| 2013/0082672 A1 * | 4/2013 | Kim ........................ G05F 1/575 323/280 |
| 2013/0176006 A1 * | 7/2013 | van Ettinger ............. G05F 1/56 323/265 |
| 2013/0200870 A1 | 8/2013 | Pradhan |
| 2014/0084881 A1 | 3/2014 | Shin et al. |
| 2014/0239929 A1 * | 8/2014 | Fiocchi .................. G05F 1/575 323/281 |
| 2014/0266108 A1 * | 9/2014 | Botker .................. H03F 1/0261 323/282 |
| 2016/0116927 A1 * | 4/2016 | Chen ....................... H02M 1/36 323/280 |
| 2016/0173066 A1 * | 6/2016 | Yang .................. H03K 19/0013 327/109 |
| 2016/0181913 A1 * | 6/2016 | Feng ....................... H02M 3/07 327/536 |
| 2016/0285366 A1 * | 9/2016 | Lee ..................... H05B 33/0815 |
| 2017/0126118 A1 * | 5/2017 | Duong .................... H02M 1/08 |
| 2017/0371364 A1 * | 12/2017 | Vareljian ................ G05F 1/575 |

\* cited by examiner

LPF11, LPF11P

LPF12

REGULATOR CIRCUIT WITH ENHANCED RIPPLE REDUCTION SPEED

CROSS-REFERENCE TO RELATED APPLICATION

A claim of priority under 35 USC § 119 is made to Korean Patent Application No. 10-2015-0099554, filed on Jul. 14, 2015, in the Korean Intellectual Property Office (KIPO), the disclosure of which is incorporated by reference in its entirety herein.

BACKGROUND

Example embodiments generally relate to the regulation of output voltages, and more particularly, example embodiments relate regulator circuits which in enhance a speed at which ripple in an output voltage signal is reduced.

Regulators, which are utilized as voltage sources in a wide variety of electronic circuits, are generally designed to generate a desired output voltage signal irrespective of variations in input voltage signal. The regulators typically include a power transistor which drives an output load of the electronic device.

Recently, as the power consumption of electronic circuits increases, a size and gate capacitance of the power transistor increases as well. This can be problematic in that the relatively large gate capacitance increases the time needed to remove ripple from the output voltage signal.

SUMMARY

According to example embodiments, a regulator circuit includes an OP-amp, a buffer, a power transistor, a voltage divider, a load, and a feedback current generator. The OP-amp drives a first node as a first voltage signal by amplifying difference between an input voltage signal and a feedback voltage signal. The buffer drives a second node as a second voltage signal generated based on the first voltage signal. The power transistor includes a drain terminal receiving a supply voltage, a gate terminal connected to the second node, and a source terminal connected to a third node. The voltage divider generates the feedback voltage signal by dividing an output voltage signal of the third node. The load includes a terminal connected to the third node and another terminal receiving a ground voltage. The feedback current generator provides a first feedback current to the first node which corresponds to a ripple of the output voltage signal and which enhances a speed at which the ripple is reduced.

In an example embodiment, the first feedback current may have a positive value when the ripple may be in an undershoot condition and the first feedback current may have a negative value when the ripple may be in an overshoot condition.

In an example embodiment, the feedback current generator may include a ripple detector and a driver. The ripple detector may output a pull-up signal and a pull-down signal, which are generated based on the output voltage signal, through fourth and fifth nodes respectively. The ripple detector may activate the pull-up signal when the ripple is in an undershoot condition. The ripple detector may activate the pull-down signal when the ripple is overshoot. The driver may generate the first feedback current based on the pull-up signal and the pull-down signal.

In an example embodiment, the ripple detector may include first through third PMOS transistors, first and second low-pass filters, first through third NMOS transistors, and a current source. The first PMOS transistor may include a source terminal receiving the supply voltage, a gate terminal connected to a first internal node, and a drain terminal connected to the fifth node. The first low-pass filter may be connected to the first internal node and a second internal node. The second PMOS transistor may include a source terminal receiving the supply voltage, a gate terminal connected to the second internal node, and a drain terminal connected to the second internal node. The third PMOS transistor may include a source terminal receiving the supply voltage, a gate terminal connected to the second internal node, and a drain terminal connected to the fourth node. The first NMOS transistor may include a drain terminal connected to the fifth node, a gate terminal connected to the third node, and a source terminal connected to a third internal node. The second NMOS transistor may include a drain terminal connected to the second internal node, a gate terminal connected to the third node, and a source terminal connected to the third internal node. The second low-pass filter may be connected to the third node, the third internal node and a fourth internal node. The third NMOS transistor may include a drain terminal connected to the fourth node, a gate terminal connected to the fourth internal node, and a source terminal connected to the third internal node. The current source may include a terminal connected to the third internal node and another terminal receiving the ground voltage.

In an example embodiment, the first low-pass filter may include a resistor and a capacitor. The resistor may include a terminal connected to the first internal node and another terminal connected to the second internal node. The capacitor may include a terminal receiving the supply voltage and another terminal connected to the first internal node.

In an example embodiment, the second low-pass filter may include a resistor and a capacitor. The resistor may include a terminal connected to the third node and another terminal connected to the fourth internal node. The capacitor may include a terminal connected to the fourth internal node and another terminal connected to the third internal node.

In an example embodiment, the first low-pass filter may generate a voltage signal of the first internal node by filtering a high frequency component of a voltage signal of the second internal node. The second low-pass filter may generate a voltage signal of the fourth internal node by filtering high frequency component of a voltage signal of the third node.

In an example embodiment, aspect ratios of the first through third NMOS transistors may be the same. Aspect ratios of the first and third PMOS transistors may be respectively larger than an aspect ratio of the second PMOS transistor, respectively.

In an example embodiment, the ripple detector may include first through third PMOS transistors, first and second low-pass filters, first through third NMOS transistors, a current source, a capacitor, and a voltage source. The first PMOS transistor may include a source terminal receiving the supply voltage, a gate terminal connected to a first internal node, and a drain terminal connected to the fifth node. The first low-pass filter may be connected to the first internal node and a second internal node. The second PMOS transistor may include a source terminal receiving the supply voltage, a gate terminal connected to the second internal node, and a drain terminal connected to the second internal node. The third PMOS transistor may include a source terminal receiving the supply voltage, a gate terminal connected to the second internal node, and a drain terminal connected to the fourth node. The first NMOS transistor may include a drain terminal connected to the fifth node, a gate terminal connected to a third internal node, and a source terminal connected to a fourth internal node. The second NMOS transistor may include a drain terminal connected to the second internal node, a gate terminal connected to the third internal node, and a source terminal connected to the fourth internal node. The second low-pass filter may be connected to the third internal node, the fourth internal node and a fifth internal node. The third NMOS transistor may include a drain terminal connected to the fourth node, a gate terminal connected to the fifth internal node, and a source terminal connected to the fourth internal node. The current source may include a terminal connected to the fourth internal node and another terminal receiving the ground voltage. The capacitor may include a terminal connected to the third internal node and another terminal connected to the third node. The voltage source may provide a bias voltage to the third internal node.

In an example embodiment, the driver may include a pull-down unit and a pull-up unit. The pull-down unit may drive the first feedback current as a negative value when the pull-down signal is activated. The pull-up unit may drive the first feedback current as a positive value when the pull-up signal is activated.

In an example embodiment, the pull-down unit may include a current source, a PMOS transistor, and first and second NMOS transistors. The current source may include a terminal receiving the supply voltage and another terminal connected to a first internal node. The PMOS transistor may include a source terminal connected to the first internal node, a gate terminal connected to the fifth node, and a drain terminal connected to a second internal node. The first NMOS transistor may include a drain terminal connected to the second internal node, a gate terminal connected to the second internal node, and a source terminal receiving the ground voltage. The second NMOS transistor may include a drain terminal connected to the first node, a gate terminal connected to the second internal node, and a source terminal receiving the ground voltage.

In an example embodiment, the pull-up unit may include a current source and a PMOS transistor. The current source may include a terminal receiving the supply voltage and another terminal connected to an internal node. The PMOS transistor may include a source terminal connected to the internal node, a gate terminal connected to the fourth node, and a drain terminal connected to the first node.

In an example embodiment, the feedback current generator may provide second and third feedback currents corresponding to the ripple to the second and third nodes respectively to enhance the speed at which the ripple is reduced.

In an example embodiment, the second and third feedback currents may have positive values when the ripple is in an undershoot condition. The second and third feedback currents may have negative values when the ripple is in an overshoot condition.

In an example embodiment, the feedback current generator may include a ripple detector and a driver. The ripple detector may output a pull-up signal and a pull-down signal, which are generated based on the output voltage signal, through fourth and fifth nodes respectively. The ripple detector may activate the pull-up signal when the ripple is in an undershoot condition. The ripple detector may activate the pull-down signal when the ripple is overshoot. The driver may generate the first through third feedback currents based on the pull-up signal and the pull-down signal.

In an example embodiment, the driver may include a pull-down unit and a pull-up unit. The pull-down unit may drive at least one of the first through third feedback currents as a negative value when the pull-down signal is activated. The pull-up unit may drive at least one of the first through third feedback currents as a positive value when the pull-up signal is activated.

In an example embodiment, the pull-down unit may include a first current source, a first PMOS transistor, and first through fourth NMOS transistors. The first current source may include a terminal receiving the supply voltage and another terminal connected to a first internal node. The first PMOS transistor may include a source terminal connected to the first internal node, a gate terminal connected to the fifth node, and a drain terminal connected to a second internal node. The first NMOS transistor may include a drain terminal connected to the second internal node, a gate terminal connected to the second internal node, and a source terminal receiving the ground voltage. The second NMOS transistor may include a drain terminal connected to the first node, a gate terminal connected to the second internal node, and a source terminal receiving the ground voltage. The third NMOS transistor may include a drain terminal connected to the second node, a gate terminal connected to the second internal node, and a source terminal receiving the ground voltage. The fourth NMOS transistor may include a drain terminal connected to the third node, a gate terminal connected to the second internal node, and a source terminal receiving the ground voltage.

In an example embodiment, the pull-up unit may include second through third current sources and second through fourth PMOS transistors. The second current source may include a terminal receiving the supply voltage and another terminal connected to a third internal node. The second PMOS transistor may include a source terminal connected to the third internal node, a gate terminal connected to the fourth node, and a drain terminal connected to the first node. The third current source may include a terminal receiving the supply voltage and another terminal connected to a fourth internal node. The third PMOS transistor may include a source terminal connected to the fourth internal node, a gate terminal connected to the fourth node, and a drain terminal connected to the second node. The fourth PMOS transistor may include a source terminal receiving the supply voltage, a gate terminal connected to the fourth node, and a drain terminal connected to the third node.

According to example embodiments, a regulator circuit includes an OP-amp, a buffer, a power transistor, a sense transistor, a voltage divider, a load, a feedback current generator, and a dynamic bias current controller. The OP-amp drives a first node as a first voltage signal by amplifying a difference between an input voltage signal and a feedback voltage signal. An output resistance of the OP-amp is controlled based on a first bias current. The buffer drives a second node as a second voltage signal generated based on the first voltage signal. An output resistance of the buffer is controlled based on a second bias current. The power transistor includes a drain terminal receiving a supply voltage, a gate terminal connected to the second node, and a source terminal connected to a third node. The sense transistor includes a drain terminal connected to a fourth node, a gate terminal connected to the second node, and a source terminal connected to the third node. The voltage divider generates the feedback voltage signal by dividing an output voltage signal of the third node. The load may include a terminal connected to the third node and another terminal receiving a ground voltage. The feedback current generator may provide first through feedback currents corresponding to a ripple of the output voltage signal to the first through third nodes respectively to enhance a speed at which the ripple is reduced. The dynamic bias current controller may increase stability of the regulator circuit and minimize a quiescent current by agile control of the first and second bias currents in response to a sense current flowing from a supply voltage node to the drain terminal of the sense transistor through the fourth node.

In an example embodiment, the first bias current may be in inverse proportion to the output resistance of the OP-amp. The second bias current may be in inverse proportion to the output resistance of the buffer.

In an example embodiment, the sense current may be in proportion to an output current which is outputted from the source terminal of the power transistor.

In an example embodiment, amount of the first and second bias currents may be in proportion to an amount of the sense current.

In an example embodiment, the dynamic bias current controller may include a current sense amplifier, a current source, and a bias current generator. The current sense amplifier may output an amplified sense current, generated by amplifying the sense current, to an internal node. The current source may generate a base bias current which flows from the supply voltage node to the internal node. The bias current generator may generate the first and second bias currents based on a sum of the amplified sense current and the base bias current which are inputted from the internal node.

According to example embodiments, a regulator circuit includes an operational amplifier, a buffer, a power transistor, and a feedback current generator. The operational amplifier is configured to drive a first node as a first voltage signal generated by amplifying a difference between an input voltage signal and a feedback voltage signal, wherein the feedback voltage corresponds to an output voltage signal. The buffer is configured to drive a second node as a second voltage signal generated based on the first voltage signal. The power transistor is connected between the supply voltage and a third node, and is gated to receive the second voltage signal, and the output voltage signal is generated at the third node. The feedback current generator is connected to the third node and receives the output voltage signal, and is configured to provide at least one of first, second and feedback currents to the first, second and third nodes, respectively, where the at least one of first, second and third feedback currents enhances a speed at which a ripple in the output voltage signal is reduced.

In an example embodiment, the feedback current generator may be configured such that the at least one of first, second and third feedback currents are controlled according to in an undershoot condition and in an overshoot condition of the ripple in the output voltage signal.

In an example embodiment, the regulator circuit may further include a voltage divider configured to generate the feedback voltage signal by voltage dividing the output voltage signal.

In an example embodiment, the regulator circuit may further include a load connected between the third node and a ground voltage.

BRIEF DESCRIPTION OF THE DRAWINGS

Example embodiments of the inventive concept will be more clearly understood from the detailed description that follows taken in conjunction with the accompanying drawings.

DETAILED DESCRIPTION OF THE EMBODIMENTS

Figure 1:
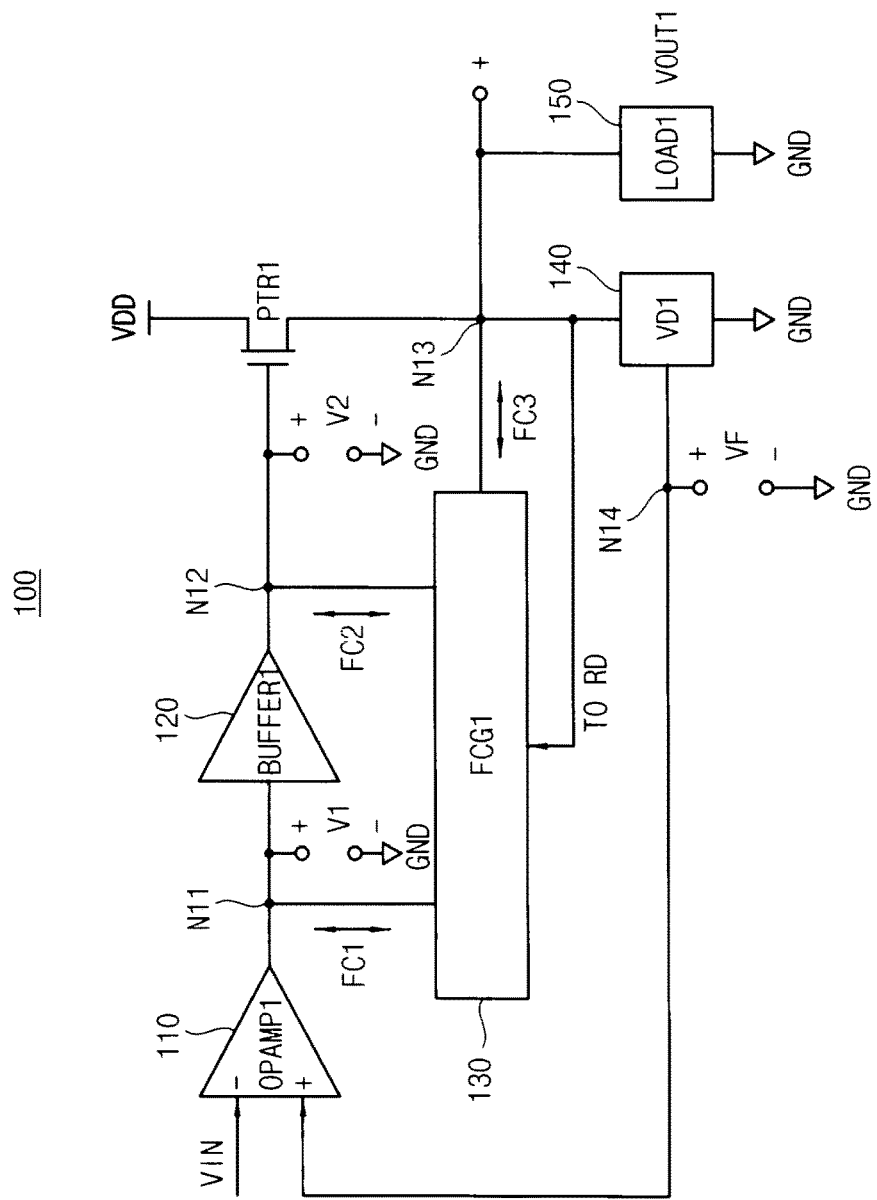
FIG. 1 is a block diagram illustrating a regulator circuit according to an example embodiment.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a regulator circuit according to an example embodiment.

Referring to FIG. 1, a regulator circuit 100 includes an OP-amp (Operational amplifier) OPAMP1 110, a buffer BUFFER1 120, a power transistor PTR1, a voltage divider VD1 140, a load LOAD1 150, and a feedback current generator FCG1 130.

The OP-amp 110 generates a first voltage signal V1 by amplifying a difference between an input voltage signal VIN and a feedback voltage signal VF. The OP-amp 110 drives a first node N11 as the first voltage signal V1. The buffer 120 drives a second node N12 as a second voltage signal V2 generated based on the first voltage signal V1. The OP-amp 110 and the buffer 120 are general circuits that are well-known to the ordinary skilled artisan, and thus a detailed internal description of the OP-amp 110 and the buffer 120 is omitted herein.

The power transistor PTR1 includes a drain terminal receiving a supply voltage VDD, a gate terminal connected to the second node N12, and a source terminal connected to a third node N13. The power transistor PTR1 should provide a stable voltage and current to multiple different types of the load 150, and thus a size of the power transistor PTR1 is relatively large and a gate capacitance of the power transistor PTR1 is also proportionally large. As such, in a conventional regulator circuit, excessive time is expended to charge or discharge the gate capacitance component of the power transistor PTR1 to remove ripple from the output voltage signal VOUT1.

In the example of this embodiment, the voltage divider 140 generates the feedback voltage signal VF by dividing an output voltage signal VOUT1 of the third node N13. The load 150 includes a terminal connected to the third node N13 and another terminal receiving a ground voltage GND. The voltage divider 140 will be described with the reference to FIG. 15, and the load 150 will be described with the reference to FIG. 16.

The feedback current generator 130 provides a first feedback current FC1 corresponding to a ripple of the output voltage signal VOUT1 to the first node N11 for enhancing a ripple reduction speed.

In an example embodiment, the feedback current generator 130 may provide second and third feedback currents FC2 and FC3 corresponding to the ripple to the second and third nodes N12 and N13 respectively for enhancing a speed at which ripple is reduced.

Figure 2:
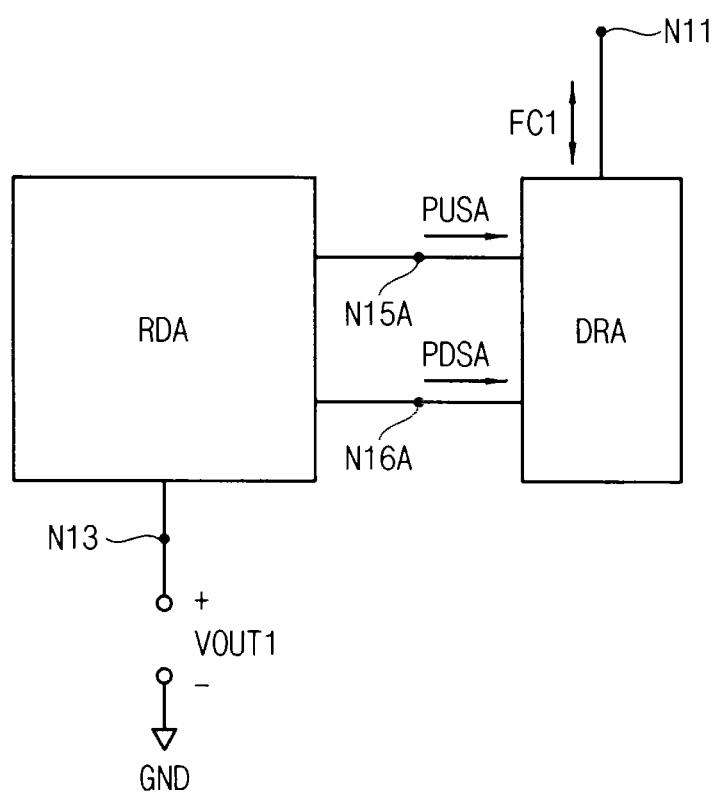
FIG. 2 is a block diagram illustrating a first example embodiment of a feedback current generator included in the regulator circuit of FIG. 1.
Figure 8:
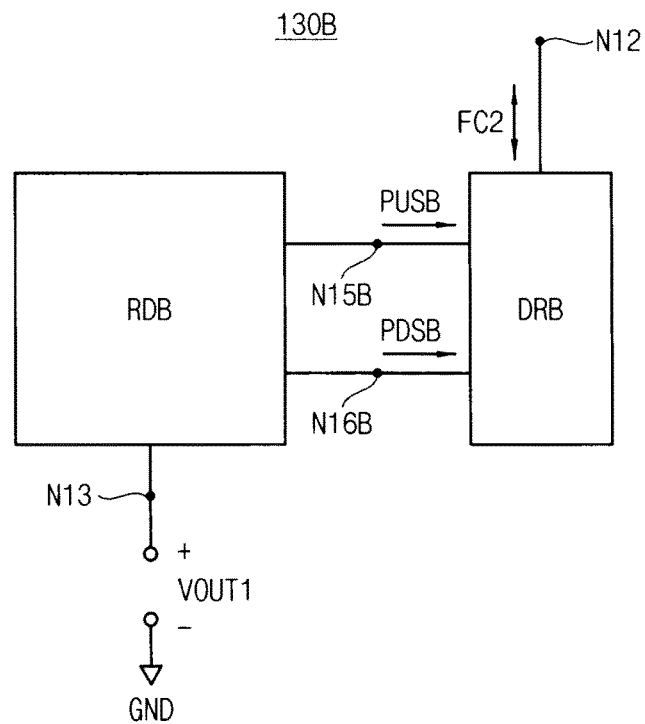
FIG. 8 is a bock diagram illustrating another example embodiment of the feedback current generator included in the regulator circuit of FIG. 1.
Figure 9:
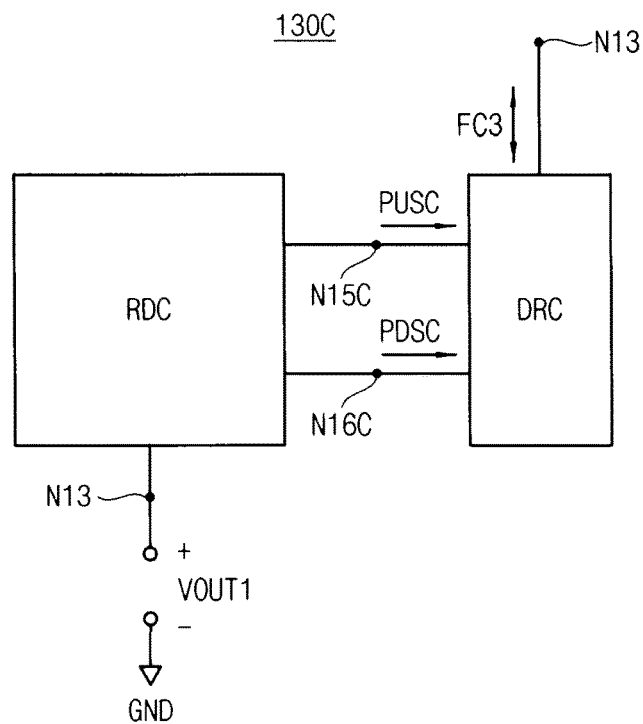
FIG. 9 is a block diagram illustrating another example embodiment of the feedback current generator included in the regulator circuit of FIG. 1.
Figure 10:
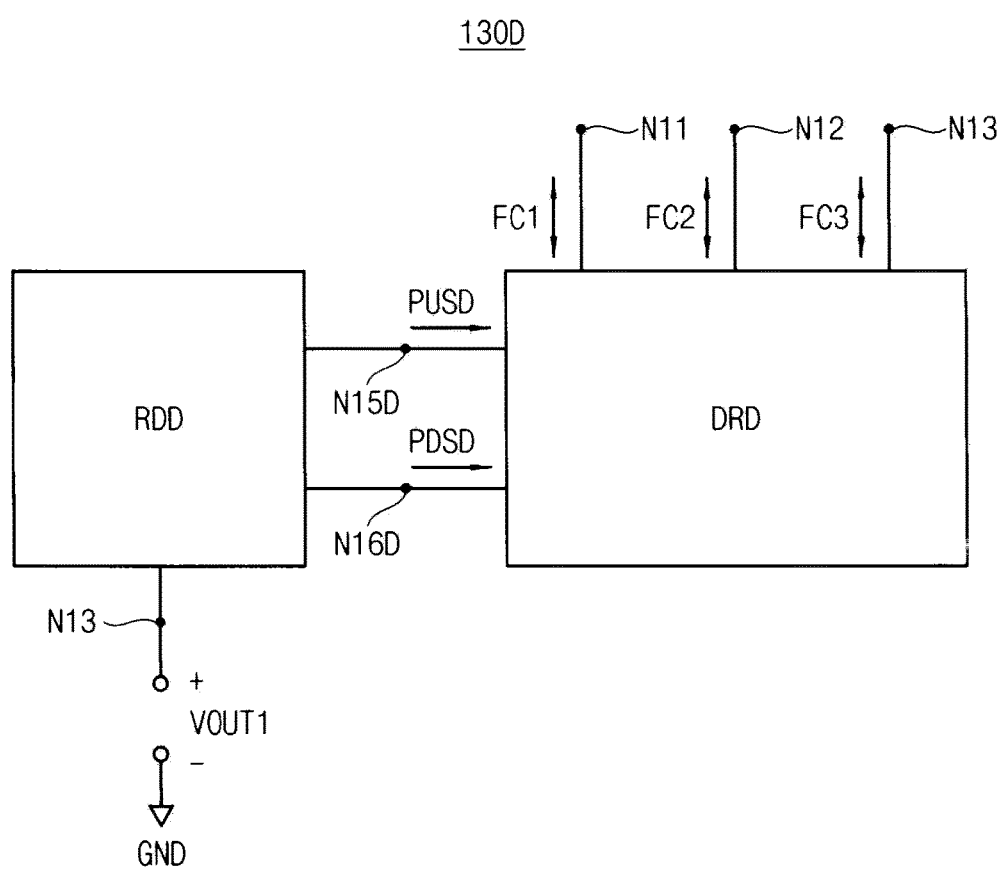
FIG. 10 is a block diagram illustrating another example embodiment of the feedback current generator included in the regulator circuit of FIG. 1.

FIG. 2 describes a first example embodiment which the feedback current generator 130 provides the first feedback current FC1 to the first node N11. FIG. 8 describes a second example embodiment which the feedback current generator 130 provides the second feedback current FC2 to the second node N12. FIG. 9 describes a third example embodiment which the feedback current generator 130 provides the third feedback current FC3 to the third node N13. FIG. 10 describes a fourth example embodiment which the feedback current generator 130 provides the first through third feedback currents FC1, FC2, and FC3 to the first through third nodes N11, N12, and N13. The feedback current generator 130 may be embodied with other structure than the feedback current generators 130A, 130B, 130C, and 130D of FIGS. 2, 8, 9, and 10.

In an example embodiment, the first through third feedback currents FC1, FC2, and FC3 may have a positive value when the ripple may be in an undershoot condition. In other words, the feedback current generator 130 may output the first through third feedback currents FC1, FC2, and FC3 to the first through third nodes N11, N12, and N13 when the ripple is in an undershoot condition.

In another example embodiment, the first through third feedback currents FC1, FC2, and FC3 may have a negative value when the ripple may be overshoot. In other words, the feedback current generator 130 may pull the first through third feedback currents FC1, FC2, and FC3 from the first through third nodes N11, N12, and N13 when the ripple is in an overshoot condition.

FIG. 2 is a block diagram illustrating a first example embodiment of the feedback current generator included in the regulator circuit of FIG. 1.

Referring to FIG. 2, the feedback current generator 130A may include a ripple detector RDA and a driver DRA. The ripple detector RDA may output a pull-up signal PUSA and a pull-down signal PDSA, which are generated based on the output voltage signal VOUT1, through fourth and fifth nodes N15A and N16A respectively. The ripple detector RDA may activate the pull-up signal PUSA when the ripple is in an undershoot condition. The ripple detector RDA may activate the pull-down signal PDSA when the ripple is in an overshoot condition. In an example embodiment, the pull-up signal PUSA and the pull-down signal PDSA may be activated as logical low level respectively and the pull-up signal PUSA and the pull-down signal PDSA may be deactivated as logical high level respectively. The driver DRA may generate the first feedback current FC1 based on the pull-up signal PUSA and the pull-down signal PDSA.

Figure 3A:
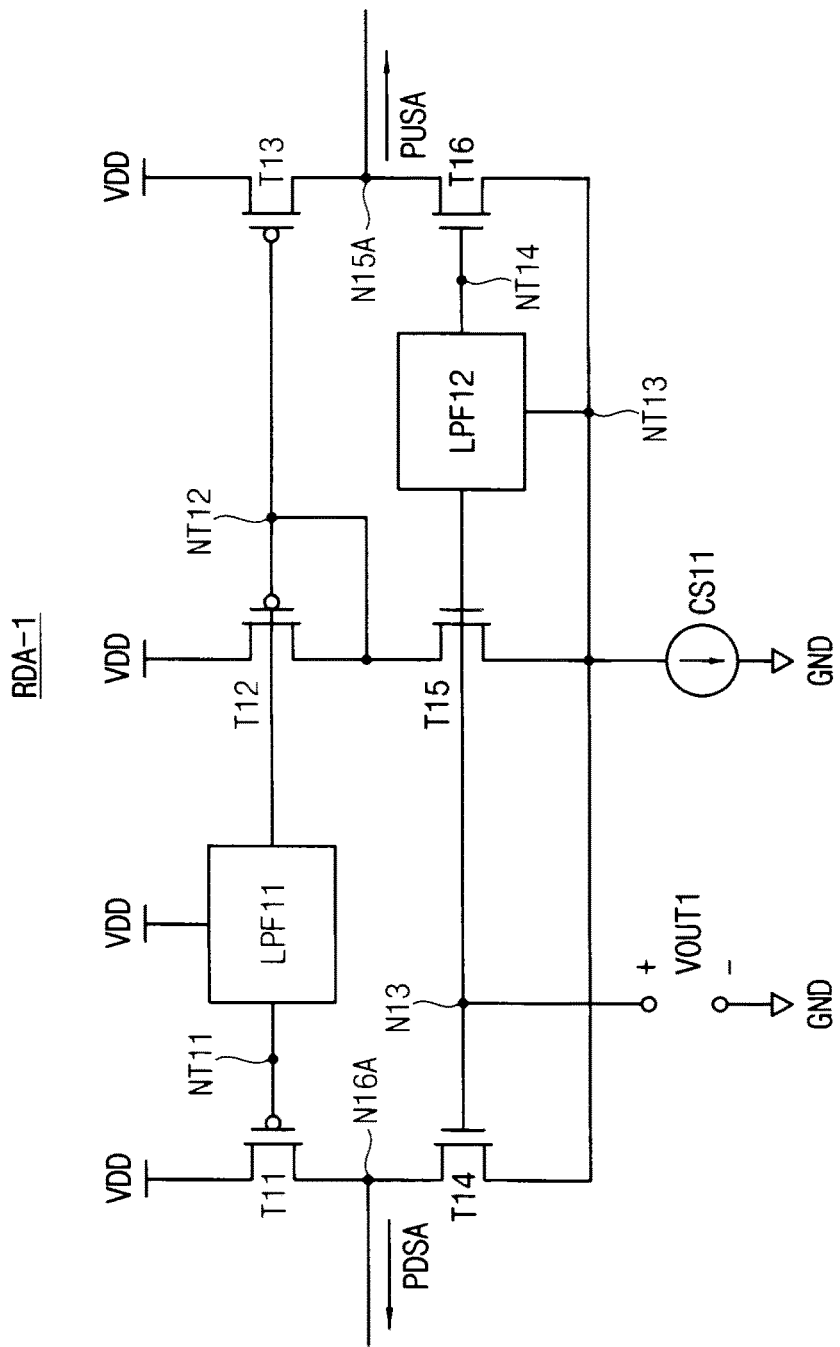
FIGS. 3A and 3B are block diagrams illustrating example embodiments of a ripple detector included in the feedback current generator of FIG. 2.
Figure 3B:
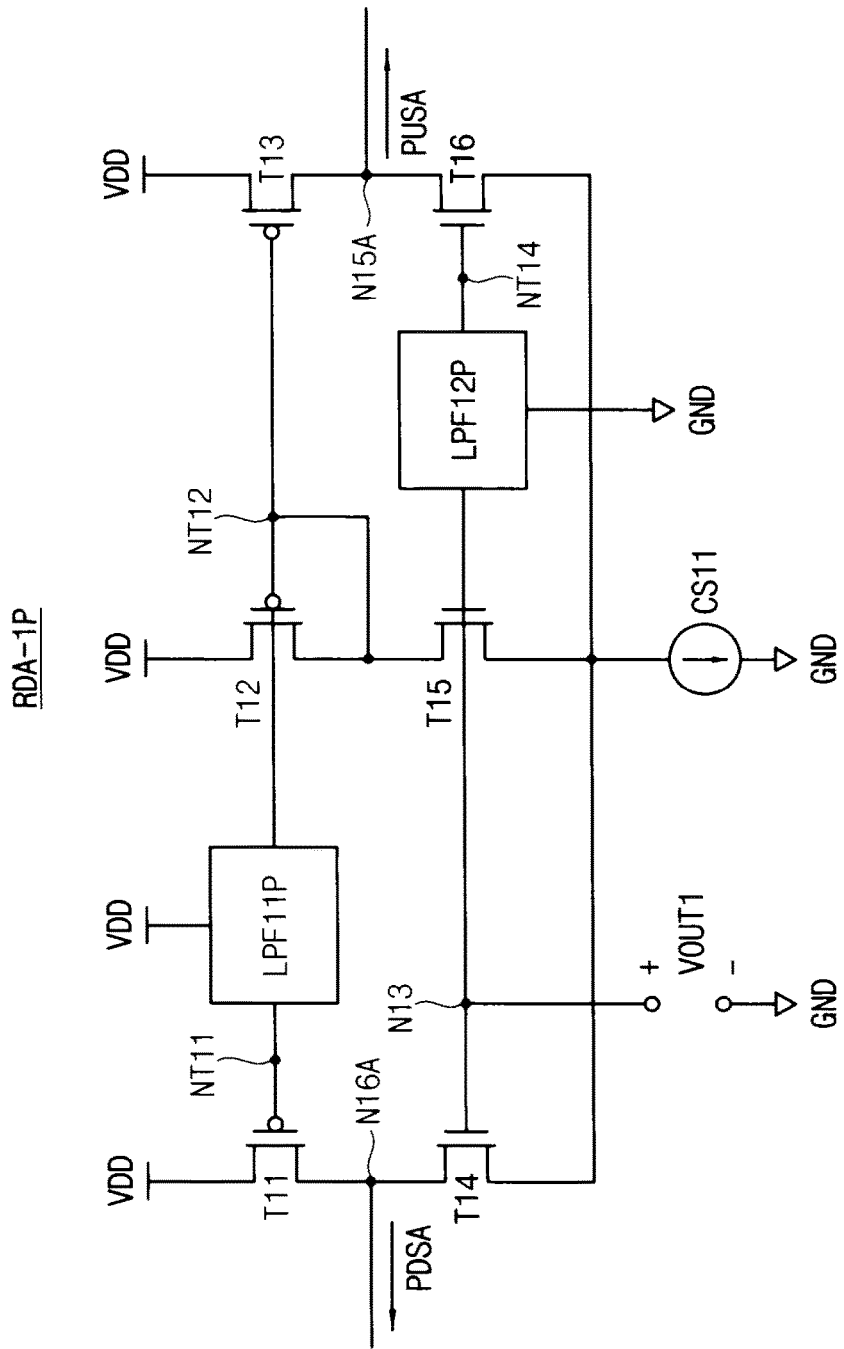

FIGS. 3A and 3B are block diagrams illustrating example embodiments of the ripple detector included in the feedback current generator of FIG. 2.

Referring to FIG. 3A, the ripple detector RDA-1 may include first through third PMOS transistors T11, T12, and T13, first and second low-pass filters LPF11, LPF12, first through third NMOS transistors T14, T15, and T16, and a current source CS11.

The first PMOS transistor T11 may include a source terminal receiving the supply voltage VDD, a gate terminal connected to a first internal node NT11, and a drain terminal connected to the fifth node N16A. The pull-down signal PDSA may be outputted from the fifth node N16A. The first low-pass filter LPF11 may be connected to the first internal node NT11 and a second internal node NT12. The second PMOS transistor T12 may include a source terminal receiving the supply voltage VDD, a gate terminal connected to the second internal node NT12, and a drain terminal connected to the second internal node NT12. The third PMOS transistor T13 may include a source terminal receiving the supply voltage VDD, a gate terminal connected to the second internal node NT12, and a drain terminal connected to the fourth node N15A. The pull-up signal PUSA may be outputted from the fourth node N15A.

The first and second PMOS transistors T11 and T12 forms a first current mirror structure and the second and third PMOS transistors T12 and T13 forms a second current mirror structure. In an example embodiment, aspect ratios (W/L) of the first and third PMOS transistors T11 and T13 may be K-times bigger than aspect ratio of the second PMOS transistor T12. K may be a rational number bigger than 1. In other words, current driving power of the first and third PMOS transistor T11, T13 may be K-times bigger than current driving power of the second PMOS transistor T12. In this case, resistance between drain terminal and source terminal of the first and third PMOS transistors T11 and T13 decreases, voltages of the fourth and fifth nodes N15A and N16A becomes close to the supply voltage VDD, and the first and third PMOS transistors T11 and T13 may mostly operate in the linear region.

The first NMOS transistor T14 may include a drain terminal connected to the fifth node N16A, a gate terminal connected to the third node N13, and a source terminal connected to a third internal node NT13. The second NMOS transistor T15 may include a drain terminal connected to the second internal node NT12, a gate terminal connected to the third node N13, and a source terminal connected to the third internal node NT13. The second low-pass filter LPF12 may be connected to the third node N13, the third internal node NT13 and a fourth internal node NT14. The third NMOS transistor T16 may include a drain terminal connected to the fourth node N15A, a gate terminal connected to the fourth internal node NT14, and a source terminal connected to the third internal node NT13. The current source CS11 may include a terminal connected to the third internal node NT13 and another terminal receiving the ground voltage GND. In an example embodiment, aspect ratios of the first through third NMOS transistors T14, T15 and T16 may be the same.

In a case that the output voltage signal VOUT1 has transient falling ripple, in other words the ripple of the output voltage signal VOUT1 is in an undershoot condition, resistance between drain terminal and source terminal of the second NMOS transistor T15 increases and voltage of the second internal node NT12 increases because gate terminal voltage of the second NMOS transistor T15 decreases. The falling ripple of the output voltage signal VOUT1 has high frequency component and voltage rising ripple of the second internal node NT12 has also high frequency component. The voltage rising ripple of the second internal node NT12 is filtered by the first low-pass filter LPF11, and is not transferred to the first internal node NT11. Because gate terminal voltage of the first NMOS transistor T14 decreases, resistance between drain terminal and source terminal of the first NMOS transistor T14 increases and voltage of the fifth node N16A increases with K-times larger step than falling step of the output voltage signal VOUT1 by big current driving power of the first PMOS transistor T11, and the pull-down signal PDSA is deactivated. Because the gate terminal voltage of the third PMOS transistor T13 increases, resistance between drain terminal and source terminal of the third PMOS transistor T13 increases and voltage of the fourth node N15A decreases with K-times larger step than falling step of the output voltage signal VOUT1 by big current driving power of the third PMOS transistor T13, and the pull-up signal PUSA is activated.

In a case that the output voltage signal VOUT1 has transient rising ripple, in other words the ripple of the output voltage signal VOUT1 is in an overshoot condition, resistance between drain terminal and source terminal of the second NMOS transistor T15 decreases and voltage of the second internal node NT12 decreases because gate terminal voltage of the second NMOS transistor T15 increases. The rising ripple of the output voltage signal VOUT1 has high frequency component and voltage falling ripple of the second internal node NT12 has also high frequency component. The voltage falling ripple of the second internal node NT12 is filtered by the first low-pass filter LPF11, and is not transferred to the first internal node NT11. Because gate terminal voltage of the first NMOS transistor T14 increases, resistance between drain terminal and source terminal of the first NMOS transistor T14 decreases and voltage of the fifth node N16A decreases with K-times larger step than rising step of the output voltage signal VOUT1 by big current driving power of the first PMOS transistor T11, and the pull-down signal PDSA is activated. Because the gate terminal voltage of the third PMOS transistor T13 decreases, resistance between drain terminal and source terminal of the third PMOS transistor T13 decreases and voltage of the fourth node N15A increases with K-times larger step than rising step of the output voltage signal VOUT1 by big current driving power of the third PMOS transistor T13, and the pull-up signal PUSA is deactivated.

Referring to FIG. 3B, the ripple detector RDA-1P has the same structure with the ripple detector RDA-1 of FIG. 3A except connection of the second low-pass filter LPF12P. The second low-pass filter LPF12P may be connected to the third node N13, the ground voltage GND node, and the fourth internal node NT14.

Figure 4:
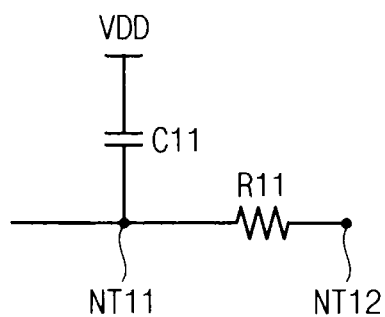
FIG. 4 is a circuit diagram illustrating a first low-pass filter included in the ripple detector of FIG. 3.

FIG. 4 is a circuit diagram illustrating the first low-pass filter included in the ripple detector of FIG. 3.

Referring to FIG. 4, the first low-pass filter LPF11 may include a resistor R11 and a capacitor C11. The resistor R11 may include a terminal connected to the first internal node NT11 and another terminal connected to the second internal node NT12. The capacitor C11 may include a terminal receiving the supply voltage VDD and another terminal connected to the first internal node NT11. The first low-pass filter LPF11 may generate a voltage signal of the first internal node NT11 by filtering high frequency component of a voltage signal of the second internal node NT12.

Figure 5A:
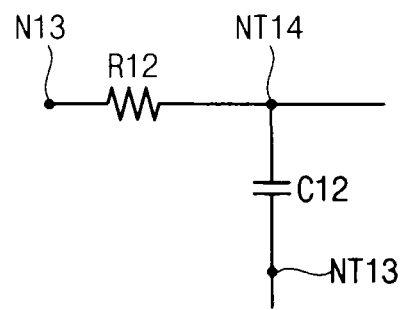
FIGS. 5A and 5B are circuit diagrams illustrating a second low-pass filters included in the ripple detector of FIG. 3.
Figure 5B:
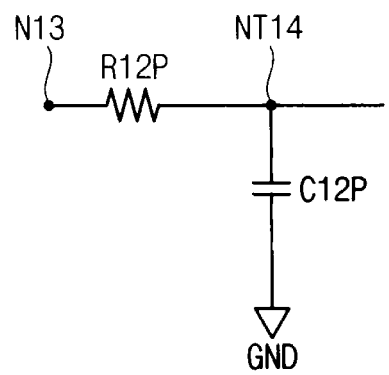

FIGS. 5A and 5B are circuit diagrams illustrating the second low-pass filters included in the ripple detector of FIG. 3.

Referring to FIG. 5A, the second low-pass filter LPF12 may include a resistor R12 and a capacitor C12. The resistor R12 may include a terminal connected to the third node N13 and another terminal connected to the fourth internal node NT14. The capacitor C12 may include a terminal connected to the fourth internal node NT14 and another terminal connected to the third internal node NT13. The second low-pass filter LPF12 may generate a voltage signal of the fourth internal node NT14 by filtering high frequency component of a voltage signal of the third node N13.

Referring to FIG. 5B, the second low-pass filter LPF12P may include a resistor R12P and a capacitor C12P. The resistor R12P may include a terminal connected to the third node N13 and another terminal connected to the fourth internal node NT14. The capacitor C12P may include a terminal connected to the fourth internal node NT14 and another terminal connected to the ground voltage GND node.

Figure 6A:
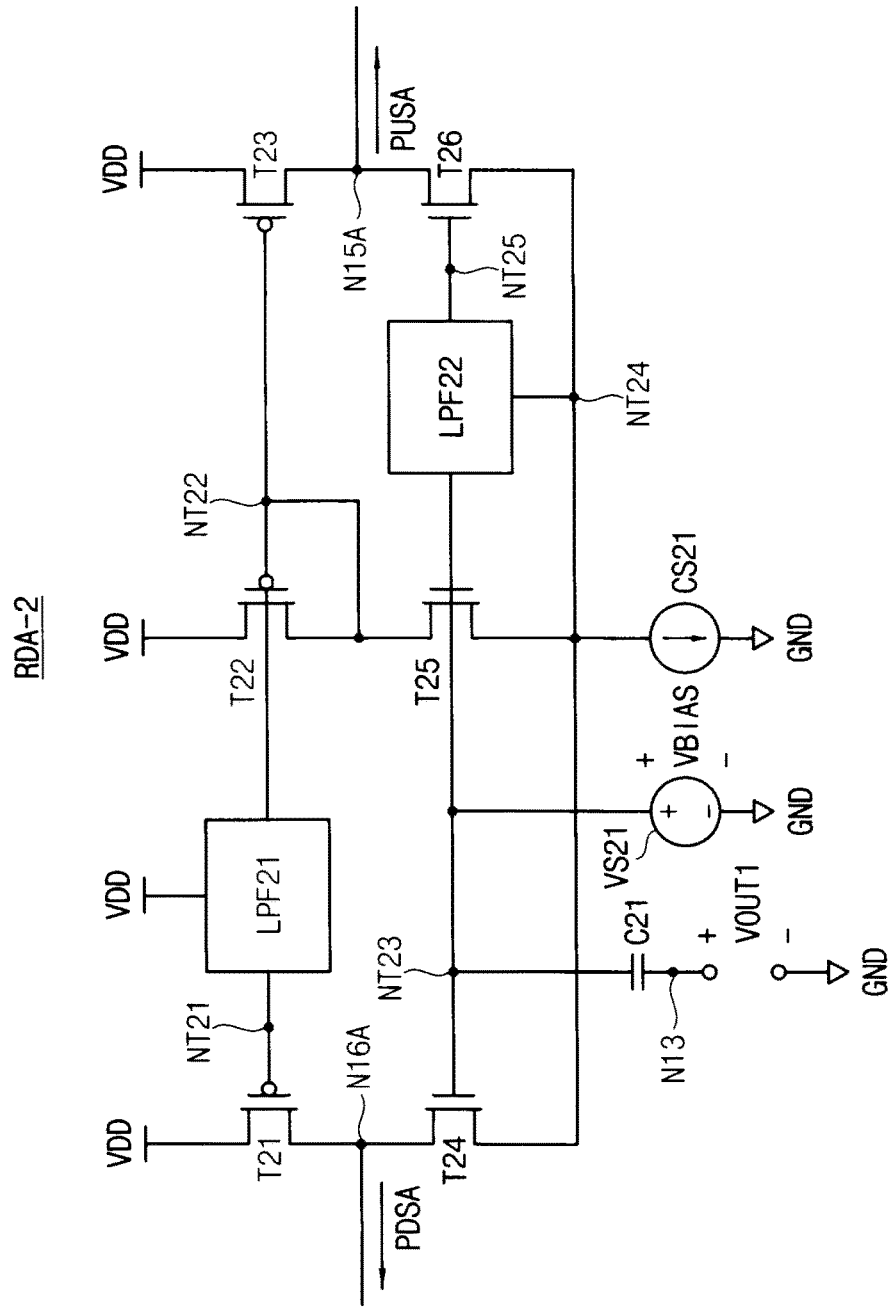
FIGS. 6A and 6B are block diagrams illustrating example embodiments of the ripple detector included in the feedback current generator of FIG. 2.
Figure 6B:
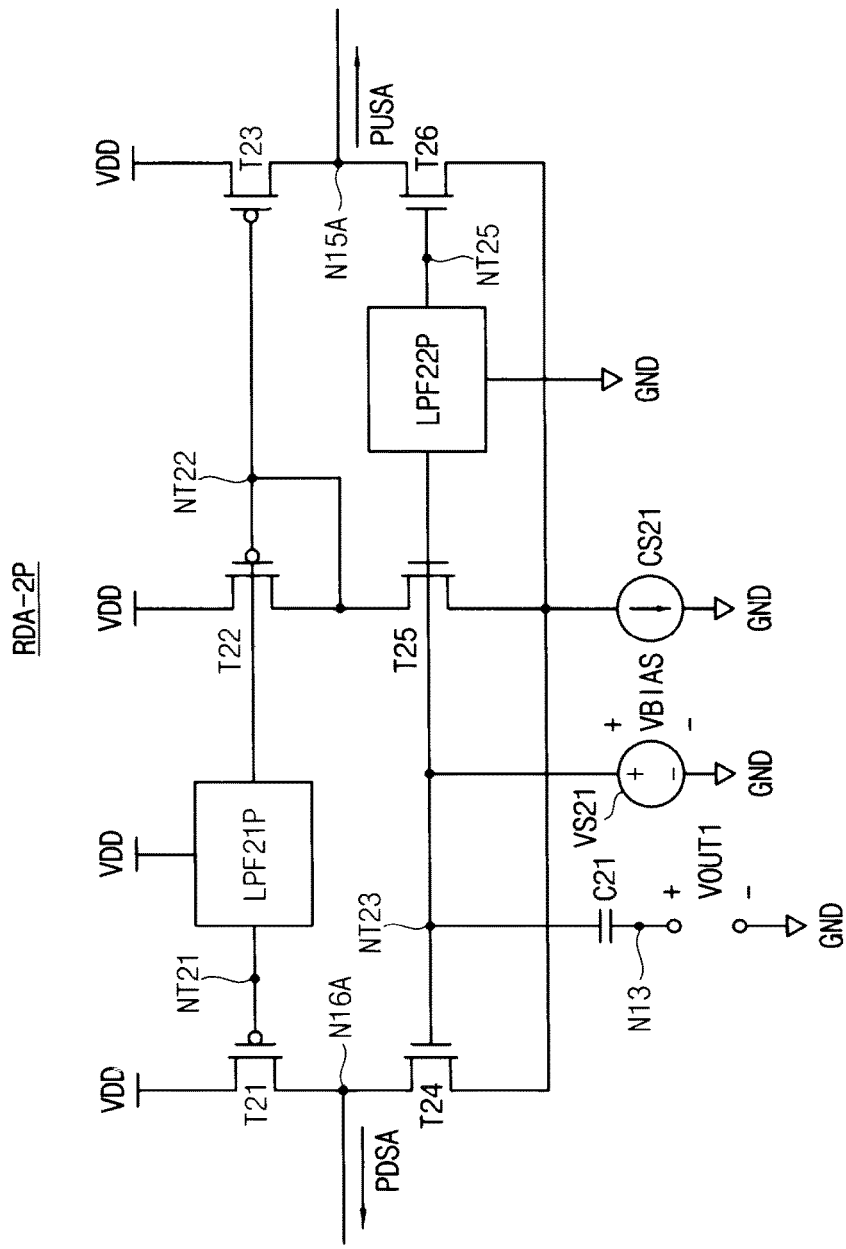

FIGS. 6A and 6B are block diagrams illustrating example embodiments of the ripple detector included in the feedback current generator of FIG. 2.

Referring to FIG. 6A, the ripple detector RDA-2 may include first through third PMOS transistors T21, T22, and T23, first and second low-pass filters LPF21 and LPF22, first through third NMOS transistors T24, T25, and T26, a current source CS21, a capacitor C21, and a voltage source VS21.

The first PMOS transistor T21 may include a source terminal receiving the supply voltage VDD, a gate terminal connected to a first internal node NT21, and a drain terminal connected to the fifth node N16A. The pull-down signal PDSA may be outputted from the fifth node N16A. The first low-pass filter LPF21 may be connected to the first internal node NT21 and a second internal node NT22. The second PMOS transistor T22 may include a source terminal receiving the supply voltage VDD, a gate terminal connected to the second internal node NT22, and a drain terminal connected to the second internal node NT22. The third PMOS transistor T23 may include a source terminal receiving the supply voltage VDD, a gate terminal connected to the second internal node NT22, and a drain terminal connected to the fourth node N15A. The pull-up signal PUSA may be outputted from the fourth node N15A.

The first and second PMOS transistors T21 and T22 forms a third current mirror structure and the second and third PMOS transistors T22 and T23 forms a fourth current mirror structure. In an example embodiment, aspect ratios (W/L) of the first and third PMOS transistors T21 and T23 may be K-times bigger than aspect ratio of the second PMOS transistor T22. K may be a rational number bigger than 1. In other words, current driving power of the first and third PMOS transistor T21, T23 may be K-times bigger than current driving power of the second PMOS transistor T22. In this case, resistance between drain terminal and source terminal of the first and third PMOS transistors T21 and T23 decreases, voltages of the fourth and fifth nodes N15A and N16A becomes close to the supply voltage VDD, and the first and third PMOS transistors T21 and T23 may mostly operate in the linear region.

The first NMOS transistor T24 may include a drain terminal connected to the fifth node N16A, a gate terminal connected to a third internal node NT23, and a source terminal connected to a fourth internal node NT24. The second NMOS transistor T22 may include a drain terminal connected to the second internal node NT22, a gate terminal connected to the third internal node NT23, and a source terminal connected to the fourth internal node NT24. The second low-pass filter LPF22 may be connected to the third internal node NT23, the fourth internal node NT24 and a fifth internal node NT25. The third NMOS transistor T26 may include a drain terminal connected to the fourth node N15A, a gate terminal connected to the fifth internal node NT25, and a source terminal connected to the fourth internal node NT24. The current source CS21 may include a terminal connected to the fourth internal node NT24 and another terminal receiving the ground voltage GND. The capacitor C21 may include a terminal connected to the third internal node NT23 and another terminal connected to the third node N13. The voltage source VS21 may provide a bias voltage VBIAS to the third internal node NT23. In an example embodiment, aspect ratios of the first through third NMOS transistors T24, T25 and T26 may be the same.

The capacitor C21 may provide only ripple component of the output voltage signal VOUT1 to the third internal node NT23.

In a case that the output voltage signal VOUT1 has transient falling ripple, in other words the ripple of the output voltage signal VOUT1 is in an undershoot condition, resistance between drain terminal and source terminal of the second NMOS transistor T25 increases and voltage of the second internal node NT22 increases because gate terminal voltage of the second NMOS transistor T25 decreases. The falling ripple of the output voltage signal VOUT1 has high frequency component and voltage rising ripple of the second internal node NT22 has also high frequency component. The voltage rising ripple of the second internal node NT22 is filtered by the first low-pass filter LPF21, and is not transferred to the first internal node NT21. Because gate terminal voltage of the first NMOS transistor T24 decreases, resistance between drain terminal and source terminal of the first NMOS transistor T24 increases and voltage of the fifth node N16A increases with K-times larger step than falling step of the output voltage signal VOUT1 by big current driving power of the first PMOS transistor T21, and the pull-down signal PDSA is deactivated. Because the gate terminal voltage of the third PMOS transistor T23 increases, resistance between drain terminal and source terminal of the third PMOS transistor T23 increases and voltage of the fourth node N15A decreases with K-times larger step than falling step of the output voltage signal VOUT1 by big current driving power of the third PMOS transistor T23, and the pull-up signal PUSA is activated.

In a case that the output voltage signal VOUT1 has transient rising ripple, in other words the ripple of the output voltage signal VOUT1 is in an overshoot condition, resistance between drain terminal and source terminal of the second NMOS transistor T25 decreases and voltage of the second internal node NT22 decreases because gate terminal voltage of the second NMOS transistor T25 increases. The rising ripple of the output voltage signal VOUT1 has high frequency component and voltage falling ripple of the second internal node NT22 has also high frequency component. The voltage falling ripple of the second internal node NT22 is filtered by the first low-pass filter LPF21, and is not transferred to the first internal node NT21. Because gate terminal voltage of the first NMOS transistor T24 increases, resistance between drain terminal and source terminal of the first NMOS transistor T24 decreases and voltage of the fifth node N16A decreases with K-times larger step than rising step of the output voltage signal VOUT1 by big current driving power of the first PMOS transistor T21, and the pull-down signal PDSA is activated. Because the gate terminal voltage of the third PMOS transistor T23 decreases, resistance between drain terminal and source terminal of the third PMOS transistor T23 decreases and voltage of the fourth node N15A increases with K-times larger step than rising step of the output voltage signal VOUT1 by big current driving power of the third PMOS transistor T23, and the pull-up signal PUSA is deactivated.

The first and second low-pass filters LPF21 and LPF22 may have same structure as the first and second low-pass filters LPF11 and LPF12 respectively. The first and second low-pass filters LPF21 and LPF22 may be understood based on FIGS. 4 and 5.

Referring to FIG. 6B, the ripple detector RDA-2P has the same structure with the ripple detector RDA-2 of FIG. 6A except connection of the second low-pass filter LPF22P. The second low-pass filter LPF22P may be connected to the third internal node NT23, the gourd voltage GND node and a fifth internal node NT25.

Figure 7:
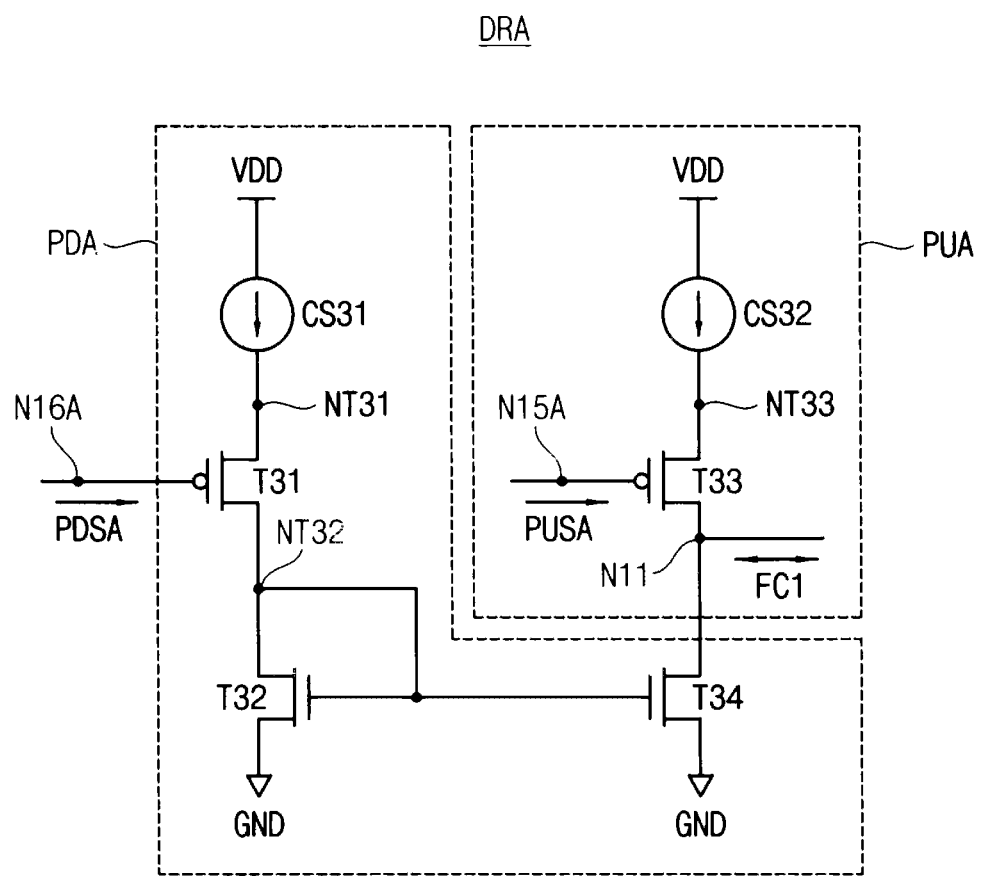
FIG. 7 is a circuit diagram illustrating an example embodiment of a driver included in the feedback current generator of FIG. 2.

FIG. 7 is a circuit diagram illustrating an example embodiment of the driver included in the feedback current generator of FIG. 2.

Referring to FIG. 7, the driver DRA may include a pull-down unit PDA and a pull-up unit PUA.

The pull-down unit PDA may include a first current source CS31, a first PMOS transistor T31, and first and second NMOS transistors T32 and T34. The first current source CS31 may include a terminal receiving the supply voltage VDD and another terminal connected to a first internal node NT31. The PMOS transistor T31 may include a source terminal connected to the first internal node NT31, a gate terminal connected to the fifth node N16A, and a drain terminal connected to a second internal node NT32. The first NMOS transistor T32 may include a drain terminal connected to the second internal node NT32, a gate terminal connected to the second internal node NT32, and a source terminal receiving the ground voltage GND. The second NMOS transistor T34 may include a drain terminal connected to the first node N11, a gate terminal connected to the second internal node NT32, and a source terminal receiving the ground voltage GND. The pull-down unit PDA may drive the first feedback current FC1 as a negative value when the pull-down signal PDSA is activated. In other words, the pull-down unit PDA may pull the first feedback current FC1 from outside when the pull-down signal PDSA is activated.

The pull-up unit PUA may include a second current source CS32 and a second PMOS transistor T33. The second current source CS32 may include a terminal receiving the supply voltage VDD and another terminal connected to a third internal node NT33. The second PMOS transistor T33 may include a source terminal connected to the third internal node NT33, a gate terminal connected to the fourth node N15A, and a drain terminal connected to the first node N11. The pull-up unit PUA may drive the first feedback current FC1 as a positive value when the pull-up signal PUSA is activated. In other words, the pull-up unit PUA may output the first feedback current FC1 to the outside when the pull-up signal PUSA is activated.

FIG. 8 is a bock diagram illustrating a second example embodiment of the feedback current generator included in the regulator circuit of FIG. 1.

Referring to FIG. 8, the feedback current generator 130B may include a ripple detector RDB and a driver DRB. The ripple detector RDB may output a pull-up signal PUSB and a pull-down signal PDSB, which are generated based on the output voltage signal VOUT1, through fourth and fifth nodes N15B and N16B respectively. The ripple detector RDB may activate the pull-up signal PUSB when the ripple is in an undershoot condition. The ripple detector RDB may activate the pull-down signal PDSB when the ripple is in an overshoot condition. In an example embodiment, the pull-up signal PUSB and the pull-down signal PDSB may be activated as logical low level respectively and the pull-up signal PUSB and the pull-down signal PDSB may be deactivated as logical high level respectively. The driver DRB may generate the second feedback current FC2 based on the pull-up signal PUSB and the pull-down signal PDSB.

FIG. 9 is a block diagram illustrating a third example embodiment of the feedback current generator included in the regulator circuit of FIG. 1.

Referring to FIG. 9, the feedback current generator 130C may include a ripple detector RDC and a driver DRC. The ripple detector RDC may output a pull-up signal PUSC and a pull-down signal PDSC, which are generated based on the output voltage signal VOUT1, through fourth and fifth nodes N15C and N16C respectively. The ripple detector RDC may activate the pull-up signal PUSC when the ripple is in an undershoot condition. The ripple detector RDC may activate the pull-down signal PDSC when the ripple is in an overshoot condition. In an example embodiment, the pull-up signal PUSC and the pull-down signal PDSC may be activated as logical low level respectively and the pull-up signal PUSC and the pull-down signal PDSC may be deactivated as logical high level respectively. The driver DRC may generate the third feedback current FC3 based on the pull-up signal PUSC and the pull-down signal PDSC.

FIG. 10 is a block diagram illustrating a fourth example embodiment of the feedback current generator included in the regulator circuit of FIG. 1.

Referring to FIG. 10, the feedback current generator 130D may include a ripple detector RDD and a driver DRD. The ripple detector RDD may output a pull-up signal PUSD and a pull-down signal PDSD, which are generated based on the output voltage signal VOUT1, through fourth and fifth nodes N15D and N16D respectively. The ripple detector RDD may activate the pull-up signal PUSD when the ripple is in an undershoot condition. The ripple detector RDD may activate the pull-down signal PDSD when the ripple is in an overshoot condition. In an example embodiment, the pull-up signal PUSD and the pull-down signal PDSD may be activated as logical low level respectively and the pull-up signal PUSD and the pull-down signal PDSD may be deactivated as logical high level respectively. The driver DRD may generate the first through third feedback current FC1, FC2, and FC3 based on the pull-up signal PUSD and the pull-down signal PDSD.

Figure 11A:
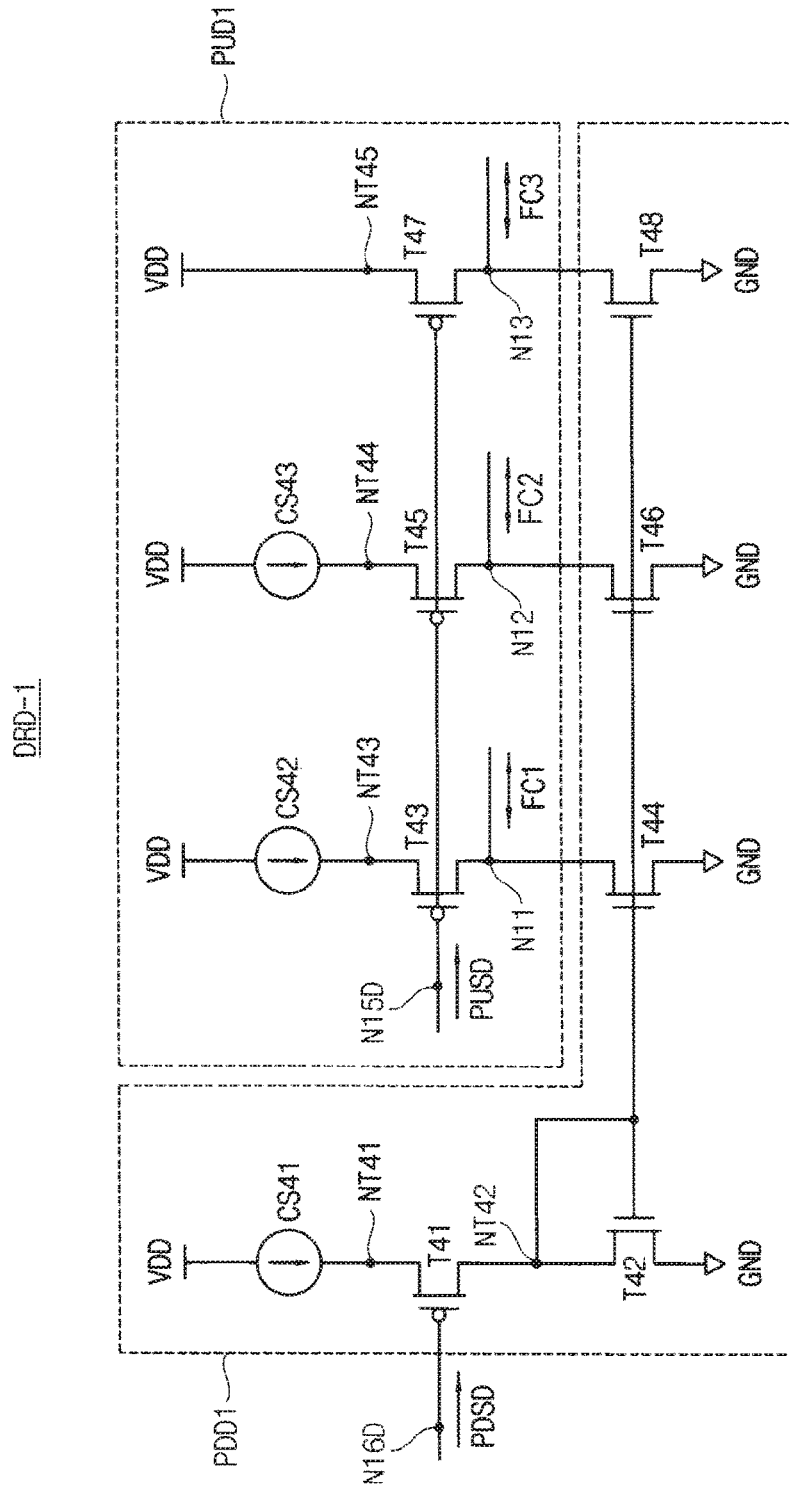
FIGS. 11A and 11B are circuit diagrams illustrating example embodiments of a driver included in the feedback current generator of FIG. 10.
Figure 11B:
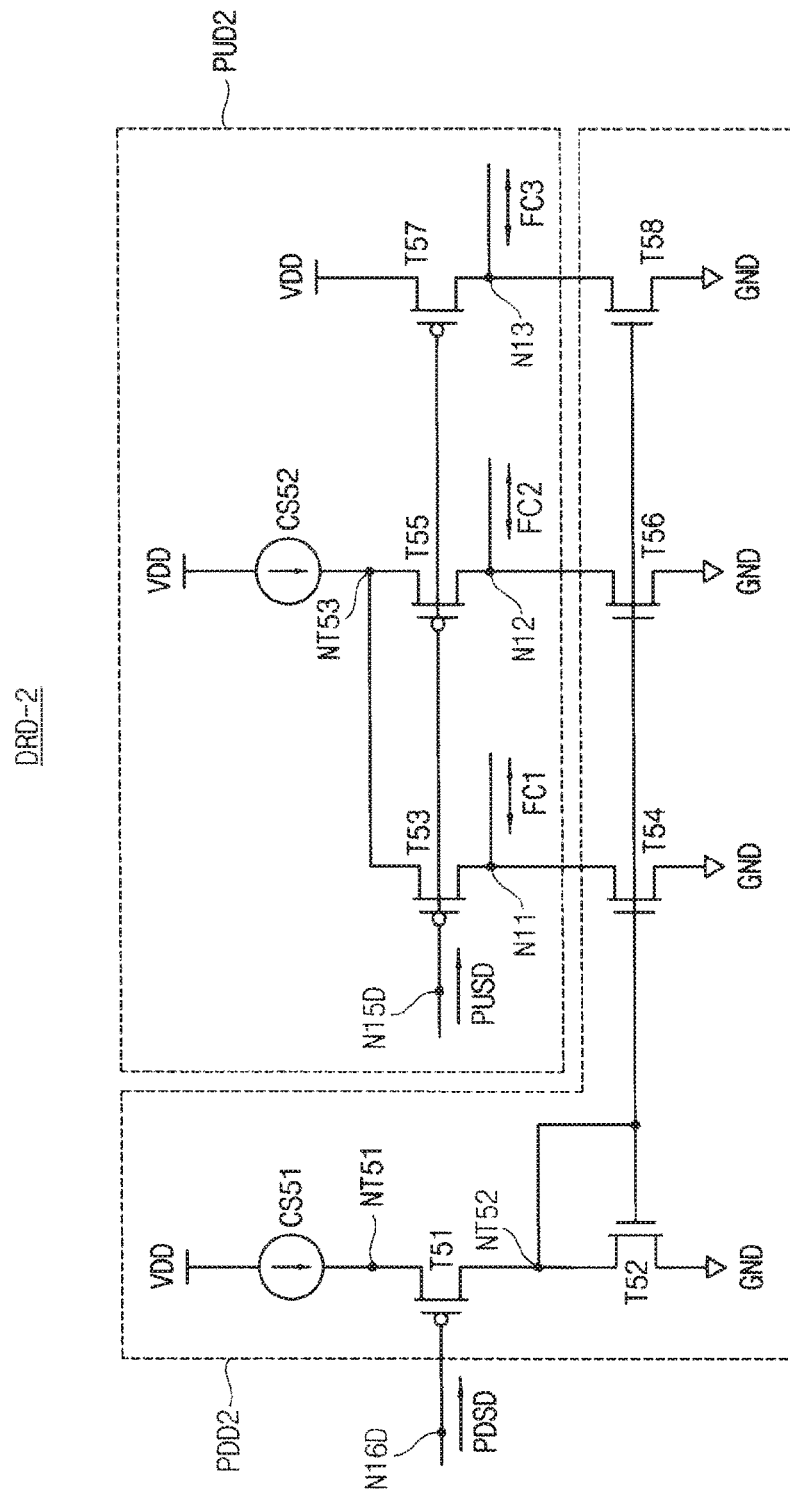

FIGS. 11 and 11B are circuit diagrams illustrating example embodiments of the driver included in the feedback current generator of FIG. 10.

Referring to FIG. 11A, the driver DRD-1 may include a pull-down unit PDD1 and a pull-up unit PUD1.

The pull-down unit PDD1 may includes a first current source CS41, a first PMOS transistor T41, and first through fourth NMOS transistors T42, T44, T46, and T48. The first current source CS41 may include a terminal receiving the supply voltage VDD and another terminal connected to a first internal node NT41. The first PMOS transistor T41 may include a source terminal connected to the first internal node NT41, a gate terminal connected to the fifth node N16D, and a drain terminal connected to a second internal node NT42. The first NMOS transistor T42 may include a drain terminal connected to the second internal node NT42, a gate terminal connected to the second internal node NT42, and a source terminal receiving the ground voltage GND. The second NMOS transistor T44 may include a drain terminal connected to the first node N11, a gate terminal connected to the second internal node NT42, and a source terminal receiving the ground voltage GND. The third NMOS transistor T46 may include a drain terminal connected to the second node N12, a gate terminal connected to the second internal node NT42, and a source terminal receiving the ground voltage GND. The fourth NMOS transistor T48 may include a drain terminal connected to the third node N13, a gate terminal connected to the second internal node NT42, and a source terminal receiving the ground voltage GND. The pull-down unit PDD1 may drive the first through third feedback currents FC1, FC2, and FC3 as negative values when the pull-down signal PDSD is activated. In other words, the pull-down unit PDD1 may pull the first through third feedback currents FC1, FC2, and FC3 from outside when the pull-down signal PDSD is activated.

The pull-up unit PUD1 may include second and third current sources CS42 and CS43 and second through fourth PMOS transistors T43, T45, and T47. The second current source CS42 may include a terminal receiving the supply voltage VDD and another terminal connected to a third internal node NT43. The second PMOS transistor T43 may include a source terminal connected to the third internal node NT43, a gate terminal connected to the fourth node N15D, and a drain terminal connected to the first node N11. The third current source CS43 may include a terminal receiving the supply voltage VDD and another terminal connected to a fourth internal node NT44. The third PMOS transistor T45 may include a source terminal connected to the fourth internal node NT44, a gate terminal connected to the fourth node N15D, and a drain terminal connected to the second node N12. The fourth PMOS transistor T47 may include a source terminal receiving the supply voltage VDD, a gate terminal connected to the fourth node N15D, and a drain terminal connected to the third node N13. The pull-up unit PUD1 may drive the first through third feedback currents FC1, FC2, and FC3 as positive values when the pull-up signal PUSD is activated. In other words, the pull-up unit PUD1 may output the first through third feedback currents FC1, FC2, and FC3 to the outside when the pull-up signal PUSD is activated.

In an example embodiment, the second and third current sources CS42 and CS43 may be removed from the driver DRD-1 such that the source terminal of the second PMOS transistor T43 may receive the supply voltage VDD and the source terminal of the third PMOS transistor T45 may receive the supply voltage VDD.

Referring to FIG. 11B, the driver DRD-2 may include a pull-down unit PDD2 and a pull-up unit PUD2.

The pull-down unit PDD2 may includes a first current source CS51, a first PMOS transistor T51, and first through fourth NMOS transistors T52, T54, T56, and T58. The first current source CS51 may include a terminal receiving the supply voltage VDD and another terminal connected to a first internal node NT51. The first PMOS transistor T51 may include a source terminal connected to the first internal node NT51, a gate terminal connected to the fifth node N16D, and a drain terminal connected to a second internal node NT52. The first NMOS transistor T52 may include a drain terminal connected to the second internal node NT52, a gate terminal connected to the second internal node NT52, and a source terminal receiving the ground voltage GND. The second NMOS transistor T54 may include a drain terminal connected to the first node N11, a gate terminal connected to the second internal node NT52, and a source terminal receiving the ground voltage GND. The third NMOS transistor T56 may include a drain terminal connected to the second node N12, a gate terminal connected to the second internal node NT52, and a source terminal receiving the ground voltage GND. The fourth NMOS transistor T58 may include a drain terminal connected to the third node N13, a gate terminal connected to the second internal node NT52, and a source terminal receiving the ground voltage GND. The pull-down unit PDD2 may drive the first through third feedback currents FC1, FC2, and FC3 as negative values when the pull-down signal PDSD is activated. In other words, the pull-down unit PDD2 may pull the first through third feedback currents FC1, FC2, and FC3 from outside when the pull-down signal PDSD is activated.

The pull-up unit PUD2 may include a second current source CS52 and second through fourth PMOS transistors T53, T55, and T57. The second current source CS52 may include a terminal receiving the supply voltage VDD and another terminal connected to a third internal node NT53. The second PMOS transistor T53 may include a source terminal connected to the third internal node NT53, a gate terminal connected to the fourth node N15D, and a drain terminal connected to the first node N11. The third PMOS transistor T55 may include a source terminal connected to the third internal node NT53, a gate terminal connected to the fourth node N15D, and a drain terminal connected to the second node N12. The fourth PMOS transistor T57 may include a source terminal receiving the supply voltage VDD, a gate terminal connected to the fourth node N15D, and a drain terminal connected to the third node N13. The pull-up unit PUD2 may drive the first through third feedback currents FC1, FC2, and FC3 as positive values when the pull-up signal PUSD is activated. In other words, the pull-up unit PUD2 may output the first through third feedback currents FC1, FC2, and FC3 to the outside when the pull-up signal PUSD is activated.

In an example embodiment, the second current source CS52 may be removed from the driver DRD-2 such that the source terminal of the second PMOS transistor T53 may receive the supply voltage VDD and the source terminal of the third PMOS transistor T55 may receive the supply voltage VDD.

Figure 12:
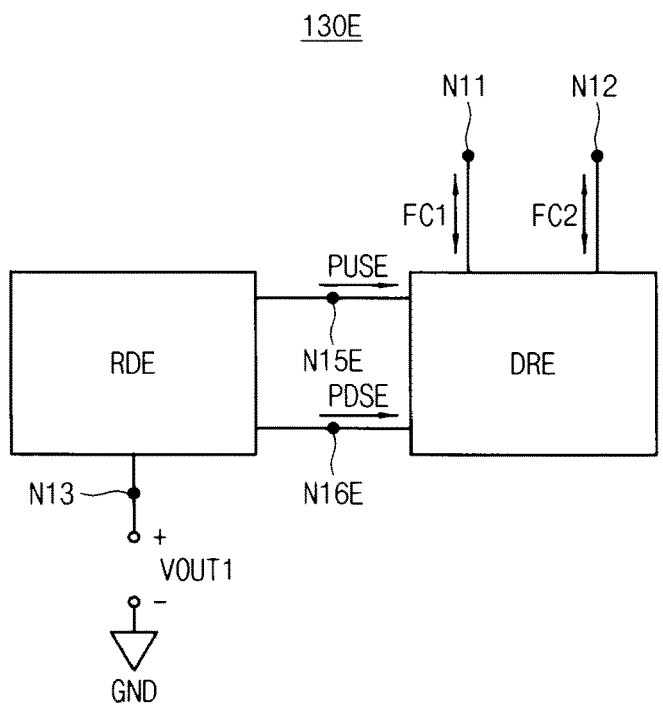
FIGS. 12, 13 and 14 are block diagrams illustrating other example embodiments of the feedback current generator included in the regulator circuit of FIG. 1.
Figure 13:
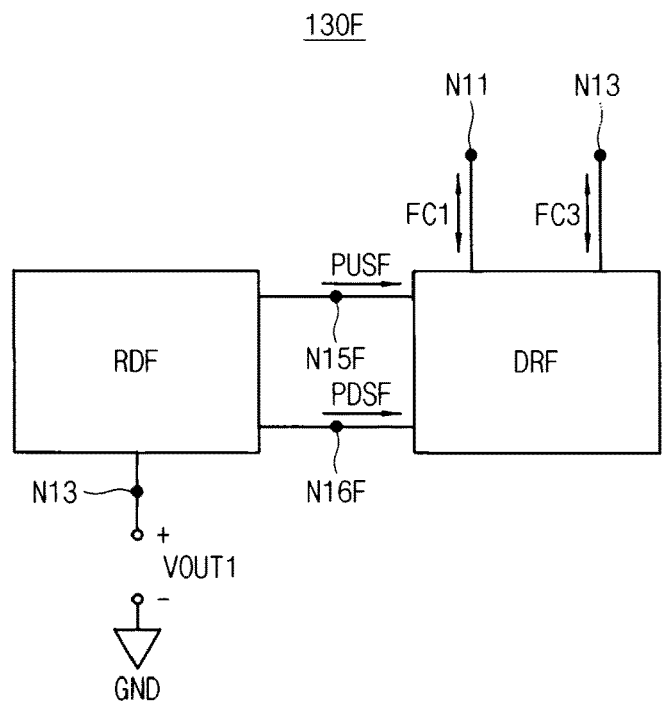
Figure 14:
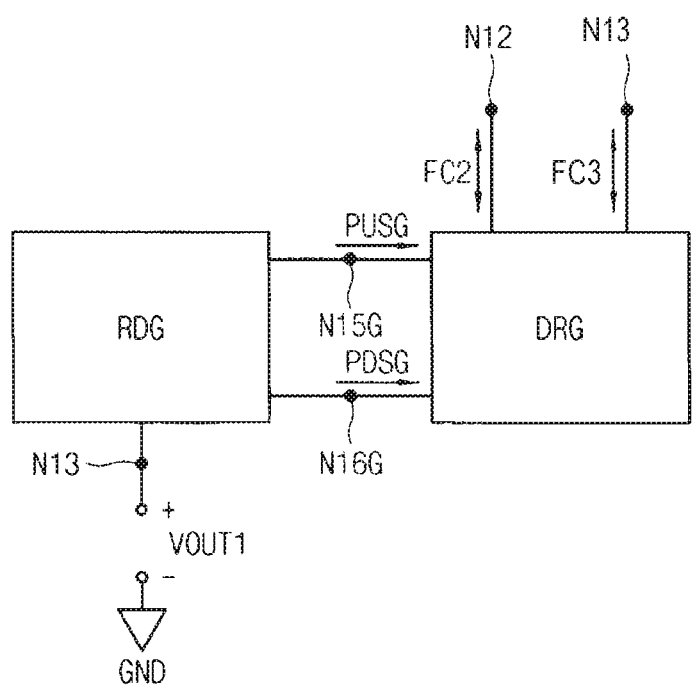

FIGS. 12 through 14 are block diagrams illustrating other example embodiments of the feedback current generator included in the regulator circuit of FIG. 1.

FIG. 12 shows a case that the feedback current generator 130E generates the first and second feedback currents FC1 and FC2. FIG. 13 shows a case that the feedback current generator 130F generates the first and third feedback currents FC1 and FC3. FIG. 14 shows a case that the feedback current generator 130G generates the second and third feedback currents FC2 and FC3.

The structure and operation of the feedback current generators 130E, 130F, and 130G may be understood based on the references to FIGS. 2, 8, 9, and 10.

Figure 15:
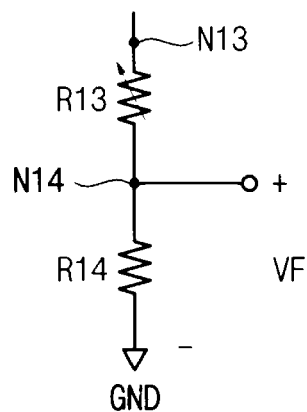
FIG. 15 is a circuit diagram illustrating a voltage divider included in the regulator circuit of FIG. 1.

FIG. 15 is a circuit diagram illustrating the voltage divider included in the regulator circuit of FIG. 1.

Referring to FIG. 15, the voltage divider 140 may include a configurable resistor R13 and a fixed resistor R14. The configurable resistor R13 may include a terminal connected to the third node N13 and another terminal connected to the fourth node N14. The fixed resistor R14 may include a terminal connected to the fourth node N14 and another terminal receiving the ground voltage GND. Resistance of the configurable resistor R13 may be configured by designer. The feedback voltage signal VF may be controlled according to the resistance of the configurable resistor R13. The voltage divider 140 may be embodied with a structure other than the structure of FIG. 15.

Figure 16:
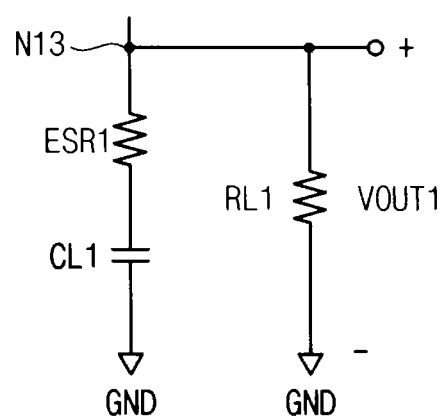
FIG. 16 is a circuit diagram illustrating a load included in the regulator circuit of FIG. 1.

FIG. 16 is a circuit diagram illustrating the load included in the regulator circuit of FIG. 1.

Referring to FIG. 16, the load 150 illustrates an equivalent circuit of a general load circuit. The load 150 may include a load capacitor CL1, a parasitic resistor ESR1 of the load capacitor CL1, and a load resistor RL1. A terminal of the parasitic resistor ESR1 is connected to the third node N13, another terminal of the parasitic resistor ESR1 is connected to a terminal of the load capacitor CL1, and another terminal of the load capacitor CL1 may receive the ground voltage GND. A terminal of the load resistor RL1 is connected to the third node N13 and another terminal of the load resistor RL1 may receive the ground voltage GND. The load 150 may be embodied with other structure than the structure of FIG. 16.

Figure 17:
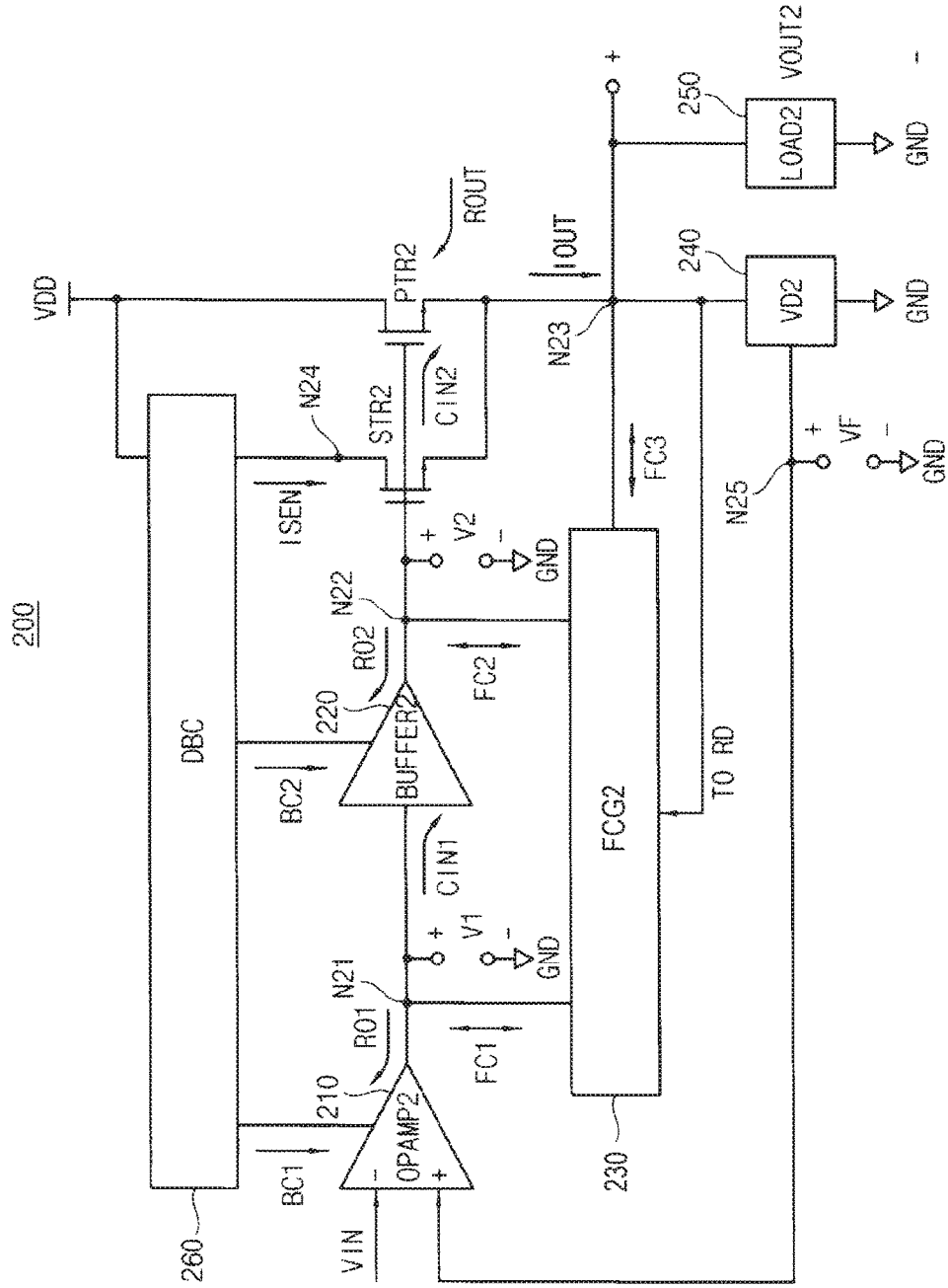
FIG. 17 is a block diagram illustrating a regulator circuit according to another example embodiment.
Figure 18:
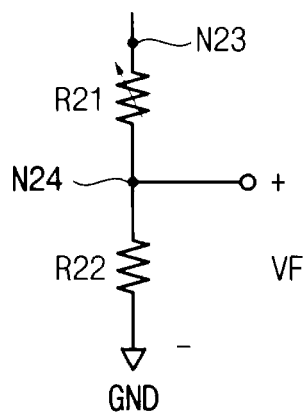
FIG. 18 is a circuit diagram illustrating a voltage divider included in the regulator circuit of FIG. 17.
Figure 19:
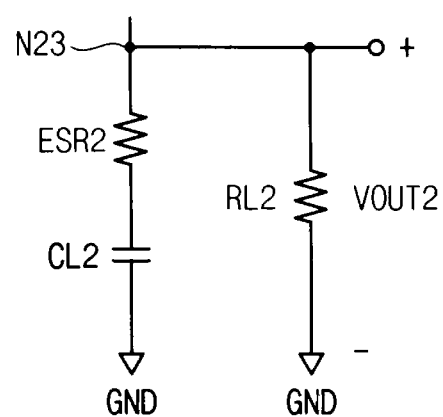
FIG. 19 is a circuit diagram illustrating a load included in the regulator circuit of FIG. 17.

FIG. 17 is a block diagram illustrating a regulator circuit according to another example embodiment. FIG. 18 is a circuit diagram illustrating the voltage divider included in the regulator circuit of FIG. 17. FIG. 19 is a circuit diagram illustrating the load included in the regulator circuit of FIG. 17.

Referring to FIGS. 17 through 19, a regulator circuit 200 includes an OP-amp OPAMP2 210, a buffer BUFFER2 220, a power transistor PTR2, a sense transistor STR2, a voltage divider VD2 240, a load LOAD2 250, a feedback current generator FCG2 230, and a dynamic bias current controller DBC 260.

The OP-amp 210 generates a first voltage signal V1 by amplifying difference between an input voltage signal VIN and a feedback voltage signal VF. The OP-amp 210 drives a first node N21 as the first voltage signal V1. The OP-amp 210 controls an output resistance of the OP-amp 210 based on a first bias current BC1. The buffer 220 drives a second node N22 as a second voltage signal V2 generated based on the first voltage signal V1. The buffer 220 controls an output resistance of the buffer 220 based on a second bias current BC2. Because the OP-amp 210 and the buffer 220 are general circuits well-known to ordinary skilled person in the art, description of the OP-amp 210 and the buffer 220 will be omitted.

The power transistor PTR2 includes a drain terminal receiving a supply voltage VDD, a gate terminal connected to the second node N22, and a source terminal connected to a third node N23. The sense transistor STR2 includes a drain terminal connected to a fourth node N24, a gate terminal connected to the second node N22, and a source terminal connected to the third node N23.

The voltage divider 240 generates the feedback voltage signal VF by dividing an output voltage signal VOUT2 of the third node N23. Referring to FIG. 18, the voltage divider 240 may include a configurable resistor R21 and a fixed resistor R22. The configurable resistor R22 may include a terminal connected to the third node N23 and another terminal connected to the fourth node N24. The fixed resistor R22 may include a terminal connected to the fourth node N24 and another terminal receiving the ground voltage GND. Resistance of the configurable resistor R21 may be configured by designer. The feedback voltage signal VF may be controlled according to the resistance of the configurable resistor R21. The voltage divider 240 may be embodied with a structure other than the structure of FIG. 18.

The load 250 may include a terminal connected to the third node N23 and another terminal receiving a ground voltage GND. Referring to FIG. 19, the load 250 illustrates an equivalent circuit of a general load circuit. The load 250 may include a load capacitor CL2, a parasitic resistor ESR2 of the load capacitor CL2, and a load resistor RL2. A terminal of the parasitic resistor ESR2 is connected to the third node N23, another terminal of the parasitic resistor ESR2 is connected to a terminal of the load capacitor CL2, and another terminal of the load capacitor CL2 may receive the ground voltage GND. A terminal of the load resistor RL2 is connected to the third node N23 and another terminal of the load resistor RL2 may receive the ground voltage GND. The load 250 may be embodied with other structure than the structure of FIG. 19.

The feedback current generator 230 may provide first through feedback currents FC1, FC2, and FC3 corresponding to a ripple of the output voltage signal VOUT2 to the first through third nodes N21, N22, and N23 respectively for enhancing a speed at which ripple is reduced. The feedback current generator 230 may be embodied with one of the feedback current generators 130A, 130B, 130C, and 130D of FIGS. 2, 8, 9, and 10. The feedback current generator 230 may be understood based on the references to FIGS. 2 through 14.

The dynamic bias current controller 260 may increase stability of the regulator circuit 200 and minimize a quiescent current by agile control of the first and second bias currents BC1 and BC2 in response to a sense current ISEN flowing from a supply voltage node to the drain terminal of the sense transistor STR2 through the fourth node N24.

In an example embodiment, the first bias current BC1 may be in inverse proportion to the output resistance of the OP-amp 210. The second bias current BC2 may be in inverse proportion to the output resistance of the buffer 220. The sense current ISEN may be in proportion to an output current IOUT which is outputted from the source terminal of the power transistor PTR2. Amount of the first and second bias currents BC1 and BC2 may be in proportion to amount of the sense current ISEN.

Figure 20:
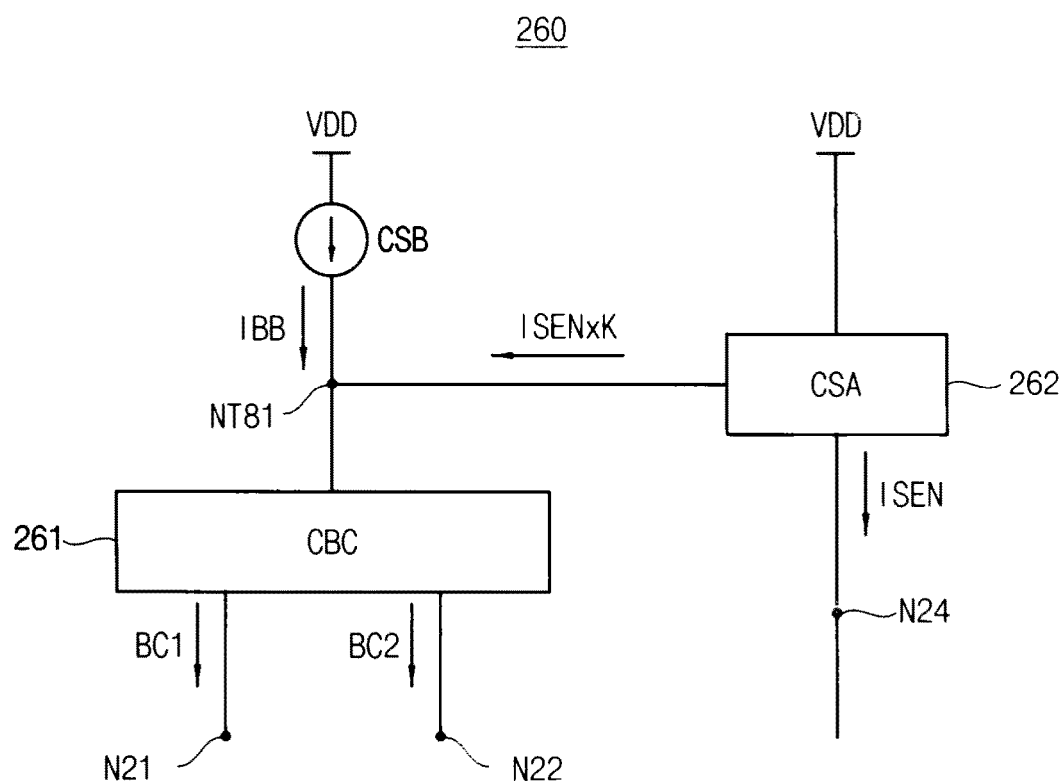
FIG. 20 is a block diagram illustrating a dynamic bias current controller included in the regulator circuit of FIG. 17.

FIG. 20 is a block diagram illustrating the dynamic bias current controller included in the regulator circuit of FIG. 17.

Referring to FIG. 20, the dynamic bias current controller 260 may include a current sense amplifier CSA 262, a current source CSB, and a bias current generator CBC 261.

The current sense amplifier 262 may output an amplified sense current ISEN×K, generated by amplifying the sense current ISEN, to an internal node NT81. The current source CSB may generate a base bias current IBB which flows from the supply voltage node to the internal node NT81.

The bias current generator 261 may generate the first and second bias currents BC1 and BC2 based on a sum of the amplified sense current ISEN×K and the base bias current IBB which are inputted from the internal node NT81. In an example embodiment, the bias current generator 261 may generate the first and second bias currents BC1 and BC2 in proportion to the sum.

Figure 21:
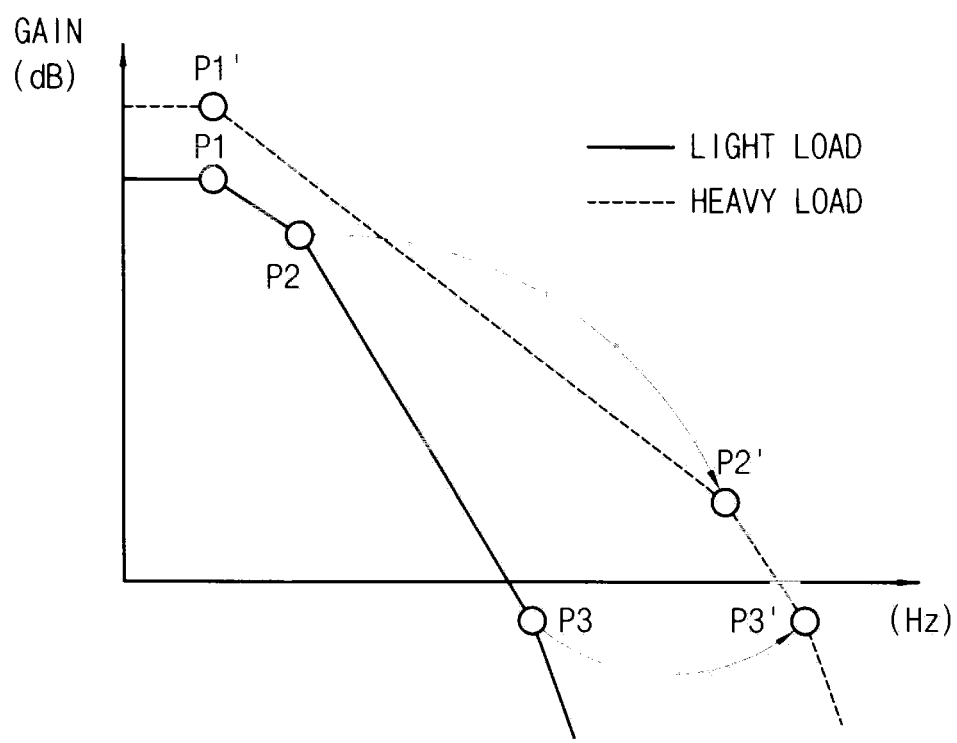
FIG. 21 is a graph illustrating dominant poles of the regulator circuit of FIG. 17.

FIG. 21 is a graph illustrating dominant poles of the regulator circuit of FIG. 17.

Referring to FIGS. 17 through 21, the regulator circuit 200 includes a first dominant pole P1, a second dominant pole P2, and a third dominant pole P3.

The first dominant pole P1 may be determined by the output resistance RO1 of the OP-amp 210 and the input capacitance CIN1 of the buffer 220 as in the following Equation 1.

$$P1 = \frac{1}{2\pi \times RO1 \times CIN1}$$ Equation 1

The second dominant pole P2 may be determined by resistances of the resistors R21 and R22 included in the voltage divider 220, the output resistance ROUT of the source terminal of the power transistor PTR2, and capacitance of the load capacitor CL2 as in the following Equation 2. The output resistance ROUT of the source terminal of the power transistor PTR2 may be changed by the output current IOUT.

$$P2 = \frac{1}{2\pi \times [(R21 + R22) \| ROUT] \times CL2}$$ Equation 2

The third dominant pole P3 may be determined by the output resistance RO2 of the buffer 220 and the gate input capacitance CIN2 of the power transistor PTR2 as in the following Equation 3.

$$P3 = \frac{1}{2\pi \times RO2 \times CIN2}$$ Equation 3

The third dominant pole P3 should be maintained bigger than the second dominant pole P2 in frequency domain for stable operation of the regulator circuit 200.

In a case that the load 250 is light (illustrated with a solid line in FIG. 21), because the regulator circuit 200 may keep current to the load 250 and the output current IOUT small and the output resistance ROUT of the source terminal of the power transistor PTR2 is kept large, the second dominant pole P2 is formed in a low frequency region. The dynamic bias current controller 260 decreases the first and second bias currents BC1 and BC2 corresponding to small sense current ISEN to increase the output resistance RO1 of the OP-amp 210 and the output resistance RO2 of the buffer 220 such that the third dominant pole P3 is kept small, but bigger than the second dominant pole P2. In the case that the load 250 is light, because the first and second bias currents BC1 and BC2 are small, a quiescent current of the regulator circuit 200 is relatively small as well.

In a case that the load 250 is heavy (illustrated with a dotted line in FIG. 21), because the regulator circuit 200 should keep current to the load 250 and the output current IOUT large and the output resistance ROUT of the source terminal of the power transistor PTR2 is kept small, the second dominant pole P2 is formed in a high frequency region. The dynamic bias current controller 260 increases the first and second bias currents BC1 and BC2 corresponding to large sense current ISEN to decrease the output resistance RO1 of the OP-amp 210 and the output resistance RO2 of the buffer 220 such that the third dominant pole P3' increases and is kept bigger than the second dominant pole P2'. In the case that the load 250 is heavy, because the first and second bias currents BC1 and BC2 are large, a quiescent current of the regulator circuit 200 is relatively large as well.

In other words, the dynamic bias current controller 260 may minimize a quiescent current by agile control of the first and second bias currents BC1 and BC2 according to the sense current ISEN which is in proportion to the output current IOUT. The dynamic bias current controller 260 maintains stable operation of the regulator circuit 200 by keeping the third dominant pole P3 or P3' to be larger than the second dominant pole P2 or P2'.

When a falling ripple occurs on the output voltage signal VOUT2, the feedback current generator 230 removes the falling ripple rapidly by enhancing gate terminal voltage of the power transistor PTR2 through providing the first and second feedback currents FC1 and FC2 to the first and second nodes N21 and N22 respectively and by enhancing voltage of the third node N32 directly through providing the third feedback current FC3 to the third node N23. The first through third feedback currents FC1, FC2, and FC3 enhance gate terminal voltage of the sense transistor STR2, the sense current ISEN, and the first and second bias currents BC1 and BC2 rapidly such that the regulator circuit 200 maintains stable operation.

When a rising ripple occurs on the output voltage signal VOUT2, the feedback current generator 230 removes the rising ripple rapidly by reducing gate terminal voltage of the power transistor PTR2 through pulling the first and second feedback currents FC1 and FC2 from the first and second nodes N21 and N22 respectively and by reducing voltage of the third node N32 directly through pulling the third feedback current FC3 from the third node N23. The first through third feedback currents FC1, FC2, and FC3 reduce gate terminal voltage of the sense transistor STR2, the sense current ISEN, and the first and second bias currents BC1 and BC2 rapidly such that the regulator circuit 200 maintains stable operation.

Consequently, the first and second feedback currents FC1 and FC2 affected by the ripple on the output voltage signal VOUT2 enables rapid reaction of the sense transistor STR2 such that the regulator circuit 200 may minimize the quiescent current by agile control of the first and second bias currents BC1 and BC2.

Figure 22:
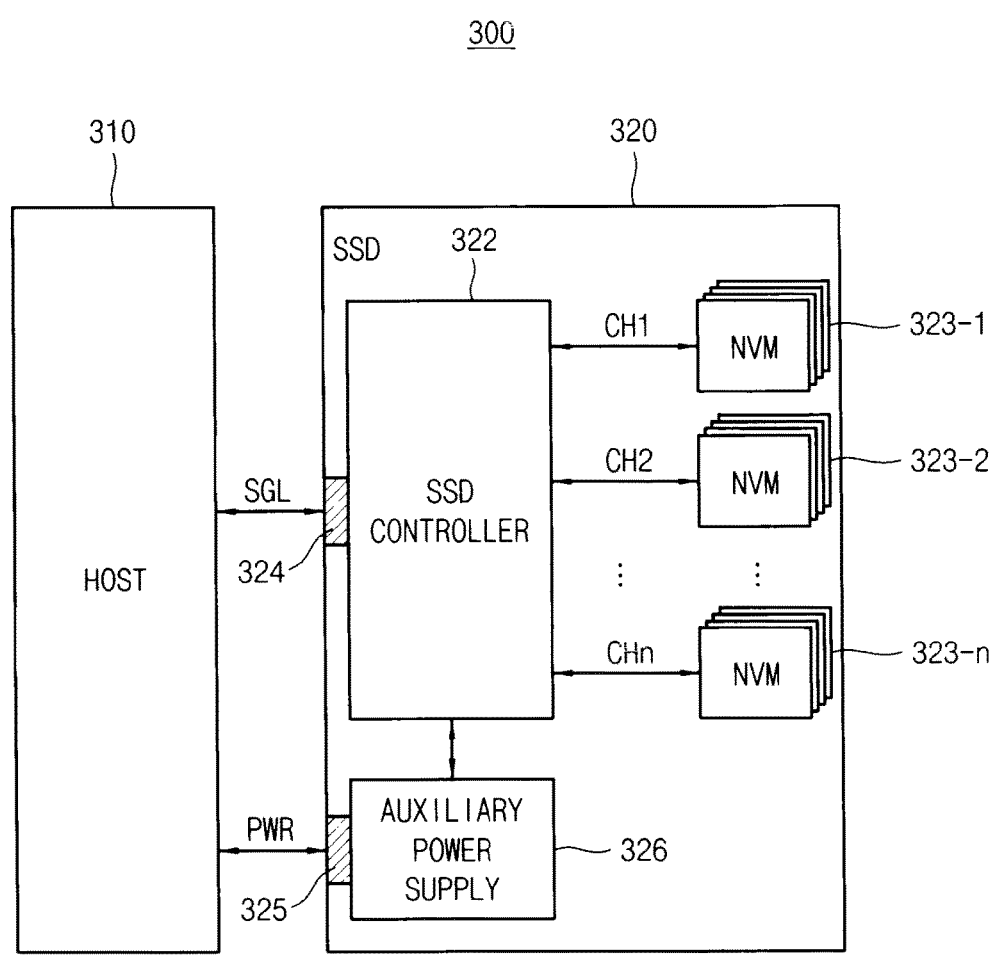
FIG. 22 is a block diagram illustrating a solid state drive system according to an example embodiment.

FIG. 22 is a block diagram illustrating a solid state drive system according to an example embodiment.

Referring to FIG. 22, a solid state drive (SSD) system 300 includes a host 310 and a SSD 320.

The SSD 320 includes first through n-th non-volatile memory devices 323-1, 323-2, . . . , 323-n and a SSD controller 322. Here, n represents an integer greater than or equal to two.

The first through n-th non-volatile memory devices 323-1, 323-2, . . . , 323-n may be used as a storage medium of the SSD 320.

Each of the first through n-th non-volatile memory devices 323-1, 323-2, . . . , 323-n may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The SSD controller 322 is coupled to the first through n-th non-volatile memory devices 323-1, 323-2, . . . , 323-n by first through n-th channels CH1, CH2, . . . , CHn, respectively.

The SSD controller 322 may exchange a signal SGL with the host 310 through a signal connector 324. The signal SGL may include a command, an address and data. The SSD controller 322 may perform a program operation and a read operation on the first through n-th non-volatile memory devices 323-1, 323-2, . . . , 323-n according to the command received from the host 310.

The SSD 320 may further include an auxiliary power supply 326. The auxiliary power supply 326 may receive power PWR from the host 310 through a power connector 325 and provide power to the SSD controller 322. The auxiliary power supply 326 may be placed inside or outside the SSD 320. For example, the auxiliary power supply 326 may be placed in a main board and provide auxiliary power to the SSD 320. The auxiliary power supply 326 may include one of the regulator circuits 100 and 200 of FIGS. 1 and 17.

Figure 23:
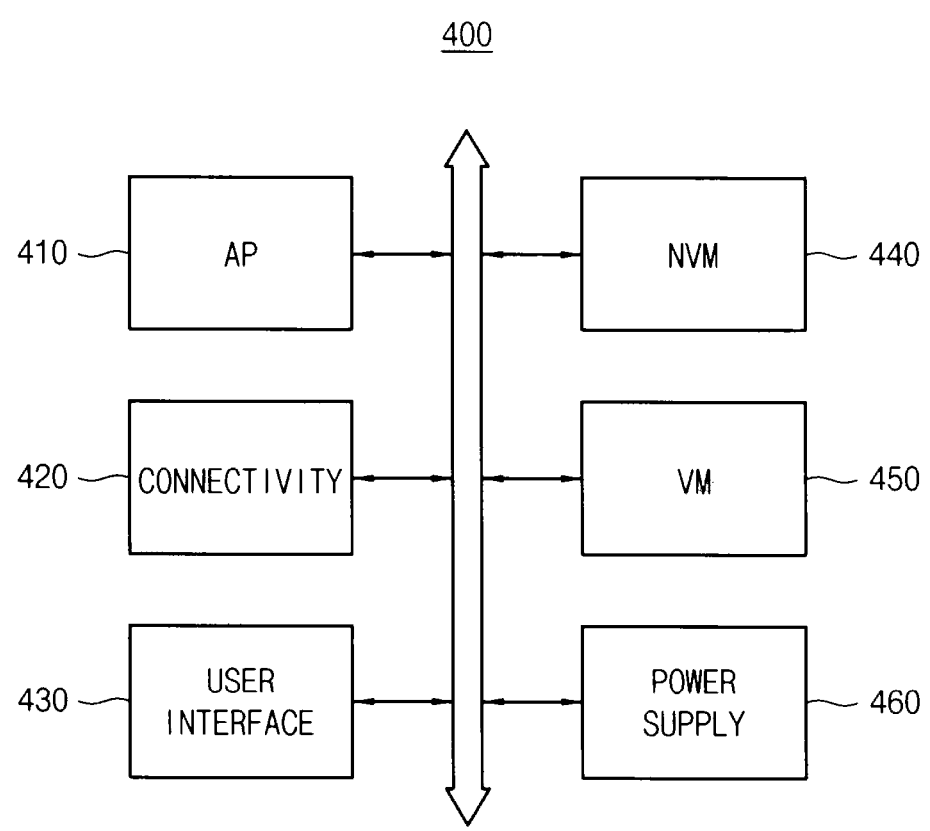
FIG. 23 is a block diagram illustrating a mobile system according to an example embodiment.

FIG. 23 is a block diagram illustrating a mobile system according to an example embodiment.

Referring to FIG. 23, a mobile system 400 includes an application processor AP 410, a connectivity unit 420, a user interface 430, a non-volatile memory device NVM 440, a volatile memory device VM 450 and a power supply 460.

In some embodiments, the mobile system 400 may be a mobile phone, a smart phone, a personal digital assistant (PDA), a portable multimedia player (PMP), a digital camera, a music player, a portable game console, a navigation system, etc.

The application processor 410 may execute applications, such as a web browser, a game application, a video player, etc. In some example embodiments, the application processor 410 may include a single core or multiple cores. For example, the application processor 410 may be a multi-core processor, such as a dual-core processor, a quad-core processor, a hexa-core processor, etc. The application processor 410 may include an internal or external cache memory.

The connectivity unit 420 may perform wired or wireless communication with an external device. For example, the connectivity unit 420 may perform Ethernet communication, near field communication (NFC), radio frequency identification (RFID) communication, mobile telecommunication, memory card communication, universal serial bus (USB) communication, etc. In some embodiments, the connectivity unit 420 may include a baseband chipset that supports communications, such as global system for mobile communications (GSM), general packet radio service (GPRS), wideband code division multiple access (WCDMA), high speed downlink/uplink packet access (HS×PA), etc.

The non-volatile memory device 440 may store a boot image for booting the mobile system 400.

The non-volatile memory device 440 may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The volatile memory device 450 may store data processed by the application processor 410, or may operate as a working memory.

The user interface 430 may include at least one input device, such as a keypad, a touch screen, etc., and at least one output device, such as a speaker, a display device, etc.

The power supply 460 may supply a power supply voltage to the mobile system 400. The power supply 460 may include one of the regulator circuits 100 and 200 of FIGS. 1 and 17.

In some embodiments, the mobile system 400 may further include an image processor, and/or a storage device, such as a memory card, a solid state drive (SSD), a hard disk drive (HDD), a CD-ROM, etc.

In some embodiments, the mobile system 400 and/or components of the mobile system 400 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A regulator circuit comprising:
an operational amplifier (OP-amp) configured to drive a first node as a first voltage signal generated by amplifying a difference between an input voltage signal and a feedback voltage signal;
a buffer configured to drive a second node as a second voltage signal generated based on the first voltage signal;
a power transistor including a drain terminal receiving a supply voltage, a gate terminal connected to the second node, and a source terminal connected to a third node;
a voltage divider configured to generate the feedback voltage signal by dividing an output voltage signal of the third node;
a load including a terminal connected to the third node and another terminal receiving a ground voltage; and
a feedback current generator configured to provide a first feedback current to the first node, the first feedback current corresponding to a ripple of the output voltage signal and enhancing a speed at which the ripple in the output voltage signal is reduced,
wherein the feedback current generator comprises
a ripple detector configured to output a pull-up signal and a pull-down signal, which are generated based on the output voltage signal, through fourth and fifth nodes respectively, wherein the ripple detector is configured to activate the pull-up signal when the ripple in the output voltage signal is in an undershoot condition, and to activate the pull-down signal when the ripple in the output voltage signal is in an overshoot condition, and
a driver configured to generate the first feedback current based on the pull-up signal and the pull-down signal.

2. The regulator circuit of claim 1, wherein the first feedback current has a positive value when the ripple in the output voltage signal is in the undershoot condition, and a negative value when the ripple in the output voltage signal is in the overshoot condition.

3. The regulator circuit of claim 1, wherein the ripple detector includes:
   a first PMOS transistor including a source terminal receiving the supply voltage, a gate terminal connected to a first internal node, and a drain terminal connected to the fifth node;
   a first low-pass filter connected to the first internal node and a second internal node;
   a second PMOS transistor including a source terminal receiving the supply voltage, a gate terminal connected to the second internal node, and a drain terminal connected to the second internal node;
   a third PMOS transistor including a source terminal receiving the supply voltage, a gate terminal connected to the second internal node, and a drain terminal connected to the fourth node;
   a first NMOS transistor including a drain terminal connected to the fifth node, a gate terminal connected to the third node, and a source terminal connected to a third internal node;
   a second NMOS transistor including a drain terminal connected to the second internal node, a gate terminal connected to the third node, and a source terminal connected to the third internal node;
   a second low-pass filter connected to the third node, the third internal node and a fourth internal node;
   a third NMOS transistor including a drain terminal connected to the fourth node, a gate terminal connected to the fourth internal node, and a source terminal connected to the third internal node; and
   a current source including a terminal connected to the third internal node and another terminal receiving the ground voltage.

4. The regulator circuit of claim 3, wherein aspect ratios of the first through third NMOS transistors are the same, wherein aspect ratios of the first and third PMOS transistors are respectively larger than an aspect ratio of the second PMOS transistor.

5. The regulator circuit of claim 1, wherein the ripple detector includes:
   a first PMOS transistor including a source terminal receiving the supply voltage, a gate terminal connected to a first internal node, and a drain terminal connected to the fifth node;
   a first low-pass filter connected to the first internal node and a second internal node;
   a second PMOS transistor including a source terminal receiving the supply voltage, a gate terminal connected to the second internal node, and a drain terminal connected to the second internal node;
   a third PMOS transistor including a source terminal receiving the supply voltage, a gate terminal connected to the second internal node, and a drain terminal connected to the fourth node;
   a first NMOS transistor including a drain terminal connected to the fifth node, a gate terminal connected to a third internal node, and a source terminal connected to a fourth internal node;
   a second NMOS transistor including a drain terminal connected to the second internal node, a gate terminal connected to the third internal node, and a source terminal connected to the fourth internal node;
   a second low-pass filter connected to the third internal node, the fourth internal node and a fifth internal node;
   a third NMOS transistor including a drain terminal connected to the fourth node, a gate terminal connected to the fifth internal node, and a source terminal connected to the fourth internal node;
   a current source including a terminal connected to the fourth internal node and another terminal receiving the ground voltage;
   a capacitor including a terminal connected to the third internal node and another terminal connected to the third node; and
   a voltage source configured to provide a bias voltage to the third internal node.

6. The regulator circuit of claim 1, wherein the driver includes:
   a pull-down unit configured to drive the first feedback current as a negative value when the pull-down signal is activated; and
   a pull-up unit configured to drive the first feedback current as a positive value when the pull-up signal is activated.

7. The regulator circuit of claim 6, wherein the pull-down unit includes:
   a current source including a terminal receiving the supply voltage and another terminal connected to a first internal node;
   a PMOS transistor including a source terminal connected to the first internal node, a gate terminal connected to the fifth node, and a drain terminal connected to a second internal node;
   a first NMOS transistor including a drain terminal connected to the second internal node, a gate terminal connected to the second internal node, and a source terminal receiving the ground voltage; and
   a second NMOS transistor including a drain terminal connected to the first node, a gate terminal connected to the second internal node, and a source terminal receiving the ground voltage.

8. The regulator circuit of claim 6, wherein the pull-up unit includes:
   a current source including a terminal receiving the supply voltage and another terminal connected to an internal node; and
   a PMOS transistor including a source terminal connected to the internal node, a gate terminal connected to the fourth node, and a drain terminal connected to the first node.

9. The regulator circuit of claim 1, wherein the feedback current generator provides second and third feedback currents corresponding to the ripple in the output voltage signal to the second and third nodes respectively to enhance the speed at which the ripple in the output voltage signal is reduced.

10. The regulator circuit of claim 9, wherein the second and third feedback currents have positive values when the ripple in the output voltage signal is in the undershoot condition, wherein the second and third feedback currents have negative values when the ripple in the output voltage signal is in the overshoot condition.

11. The regulator circuit of claim 10, wherein the driver includes:
   a pull-down unit configured to drive at least one of the first through third feedback currents as a negative value when the pull-down signal is activated; and
   a pull-up unit configured to drive at least one of the first through third feedback currents as a positive value when the pull-up signal is activated.

12. The regulator circuit of claim 11, wherein the pull-down unit includes:
a first current source including a terminal receiving the supply voltage and another terminal connected to a first internal node;
a first PMOS transistor including a source terminal connected to the first internal node, a gate terminal connected to the fifth node, and a drain terminal connected to a second internal node;
a first NMOS transistor including a drain terminal connected to the second internal node, a gate terminal connected to the second internal node, and a source terminal receiving the ground voltage;
a second NMOS transistor including a drain terminal connected to the first node, a gate terminal connected to the second internal node, and a source terminal receiving the ground voltage;
a third NMOS transistor including a drain terminal connected to the second node, a gate terminal connected to the second internal node, and a source terminal receiving the ground voltage; and
a fourth NMOS transistor including a drain terminal connected to the third node, a gate terminal connected to the second internal node, and a source terminal receiving the ground voltage.

13. The regulator circuit of claim 12, wherein the pull-up unit includes:
a second current source including a terminal receiving the supply voltage and another terminal connected to a third internal node;
a second PMOS transistor including a source terminal connected to the third internal node, a gate terminal connected to the fourth node, and a drain terminal connected to the first node,
a third current source including a terminal receiving the supply voltage and another terminal connected to a fourth internal node;
a third PMOS transistor including a source terminal connected to the fourth internal node, a gate terminal connected to the fourth node, and a drain terminal connected to the second node; and
a fourth PMOS transistor including a source terminal receiving the supply voltage, a gate terminal connected to the fourth node, and a drain terminal connected to the third node.

14. A regulator circuit comprising:
an operational amplifier (OP-amp) configured to drive a first node as a first voltage signal by amplifying a difference between an input voltage signal and a feedback voltage signal, wherein an output resistance of the OP-amp is controlled based on a first bias current;
a buffer configured to drive a second node as a second voltage signal generated based on the first voltage signal, wherein an output resistance of the buffer is controlled based on a second bias current;
a power transistor including a drain terminal receiving a supply voltage, a gate terminal connected to the second node, and a source terminal connected to a third node;
a sense transistor including a drain terminal connected to a fourth node, a gate terminal connected to the second node, and a source terminal connected to the third node;
a voltage divider configured to generate the feedback voltage signal by dividing an output voltage signal of the third node;
a load including a terminal connected to the third node and another terminal receiving a ground voltage;
a feedback current generator configured to provide first through third feedback currents corresponding to a ripple of the output voltage signal to the first through third nodes respectively to enhance a speed at which the ripple in the output voltage signal is reduced; and
a dynamic bias current controller configured to increase stability of the regulator circuit and minimize a quiescent current by agile control of the first and second bias currents in response to a sense current flowing from a supply voltage node to the drain terminal of the sense transistor through the fourth node.

15. The regulator circuit of claim 14, wherein the first bias current is in inverse proportion to the output resistance of the OP-amp,
wherein the second bias current is in inverse proportion to the output resistance of the buffer.

16. The regulator circuit of claim 14, wherein the dynamic bias current controller includes:
a current sense amplifier configured to output an amplified sense current, generated by amplifying the sense current, to an internal node;
a current source configured to generate a base bias current which flows from the supply voltage node to the internal node; and
a bias current generator configured to generate the first and second bias currents based on a sum of the amplified sense current and the base bias current which are inputted from the internal node.

17. A regulator circuit comprising:
an operational amplifier configured to drive a first node as a first voltage signal generated by amplifying a difference between an input voltage signal and a feedback voltage signal, wherein the feedback voltage signal corresponds to an output voltage signal;
a buffer configured to drive a second node as a second voltage signal generated based on the first voltage signal;
a power transistor connected between a supply voltage and a third node, and gated to receive the second voltage signal, wherein the output voltage signal is generated at the third node; and
a feedback current generator connected to the third node and receiving the output voltage signal, and configured to provide first, second and third feedback currents to the first, second and third nodes, respectively, wherein the first, second and third feedback currents enhance a speed at which a ripple in the output voltage signal is reduced.

18. The regulator circuit of claim 17, wherein the feedback current generator is configured such that the first, second and third feedback currents are controlled according to an undershoot and an overshoot of the ripple in the output voltage signal.

* * * * *